(12) United States Patent
Chow et al.

(10) Patent No.: US 10,361,870 B2
(45) Date of Patent: Jul. 23, 2019

(54) MANAGEMENT OF CRYPTOGRAPHICALLY SECURE EXCHANGES OF DATA USING PERMISSIONED DISTRIBUTED LEDGERS

(71) Applicant: The Toronto-Dominion Bank, Toronto (CA)

(72) Inventors: Arthur Carroll Chow, Markham (CA); Milos Dunjic, Oakville (CA); Perry Aaron Jones Haldenby, Toronto (CA); John Jong-Suk Lee, Toronto (CA); Anthony Haituyen Nguyen, Toronto (CA); Casey Lyn Doyle, Ajax (CA); Het Anand Patel, Mississauga (CA); Stephen John McCann, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 121 days.

(21) Appl. No.: 15/704,960

(22) Filed: Sep. 14, 2017

(65) Prior Publication Data

US 2019/0081796 A1 Mar. 14, 2019

(51) Int. Cl.
*G06F 21/60* (2013.01)
*H04L 9/32* (2006.01)
(Continued)

(52) U.S. Cl.
CPC .......... *H04L 9/3247* (2013.01); *G06Q 20/34* (2013.01); *G06Q 20/3829* (2013.01);
(Continued)

(58) Field of Classification Search
CPC .. H04L 9/32; H04L 9/08; H04L 63/04; G06Q 20/34
See application file for complete search history.

(56) References Cited

U.S. PATENT DOCUMENTS 9,635,000 B1 * 4/2017 Muftic ............... H04L 63/0435
2015/0379510 A1 12/2015 Smith
(Continued)

FOREIGN PATENT DOCUMENTS

CN 106204287 12/2016
WO WO 2015/0175854 11/2015

OTHER PUBLICATIONS

Geva, B., "Mobile Payments and Bitcoin: Concluding Reflections on the Digital Upheaval in Payments," Bitcoin and Mobile Payments, Palgrave Macmillan UK, 2016, pp. 271-287.
(Continued)

*Primary Examiner* — Wasika Nipa
(74) *Attorney, Agent, or Firm* — Duane Morris LLP

(57) ABSTRACT

The disclosed embodiments include processes that manage a cryptographically secure generation and exchange of data between network-connected systems operating within a computing environment using a permissioned distributed ledger. For example, and based on secure interaction with a distributed smart contract maintained within ledger blocks of the permissioned distributed ledger, an apparatus and a counterparty system may generate local symmetric encryption keys that facilitate a secure communication session between the apparatus and the counterparty system. Using the symmetric encryption key, the apparatus may generate a cryptographically secure representation of generated or obtained data, which may be transmitted to the counterparty system across the secure communications channel. In response to a verification of an integrity of the cryptographically secure representation, the counterparty system may perform operations that, in conjunction with corresponding node systems, record the cryptographically secure representation within a portion of the permissioned distributed ledger.

17 Claims, 16 Drawing Sheets

(51) Int. Cl.
*H04L 9/30* (2006.01)
*H04L 29/06* (2006.01)
*H04L 9/08* (2006.01)
*G06Q 20/38* (2012.01)
*G06Q 20/34* (2012.01)

(52) U.S. Cl.
CPC .......... *H04L 9/0861* (2013.01); *H04L 9/0897* (2013.01); *H04L 9/30* (2013.01); *H04L 9/3236* (2013.01); *H04L 63/0435* (2013.01); *G06Q 2220/00* (2013.01); *H04L 2209/56* (2013.01)

(56) References Cited

U.S. PATENT DOCUMENTS

| | | | |
|---|---|---|---|
| 2016/0259937 A1 | 9/2016 | Ford et al. | |
| 2016/0292672 A1* | 10/2016 | Fay | G06Q 20/363 |
| 2016/0335533 A1 | 11/2016 | David et al. | |
| 2016/0335628 A1 | 11/2016 | Weigold | |
| 2016/0342989 A1 | 11/2016 | Davis | |
| 2017/0005804 A1 | 1/2017 | Zinder | |
| 2017/0011460 A1 | 1/2017 | Molinari et al. | |
| 2017/0046806 A1 | 2/2017 | Haldenby et al. | |
| 2017/0053249 A1* | 2/2017 | Tunnell | G06F 21/316 |

OTHER PUBLICATIONS

Lohar, "Banking on Blockchain," Mar. 7, 2017 (retrieved from http://bwcio.businessworld.in/article/Banking-on-Blockchain/07-03-2017-113951/ on Sep. 4, 2017) (5 pages).

Condos et al., "Blockchain technology: Opportunities and Risks," 2016 (35 pages).

Buterin, "Privacy on the Blockchain," Jan. 15, 2016 (retrieved from https://blog.ethereum.org/2016/01/15/privacy-on-the-blockchain/ on Sep. 14, 2017 (31 pages).

Venkataraman et al., "Adopting Blockchain for enterprise asset management (EAM)," Mar. 17, 2017 (retrieved from https://www.ibm.com/developerworks/cloud/library/cl-adopting-blockchain-for-enterprise-asset-management-eam/index.html on Sep. 14, 2017.

Dynamic Account Permissions, retrieved from https://bitshares.org/technology/dynamic-account-permissions/ on Sep. 14, 2017.

* cited by examiner

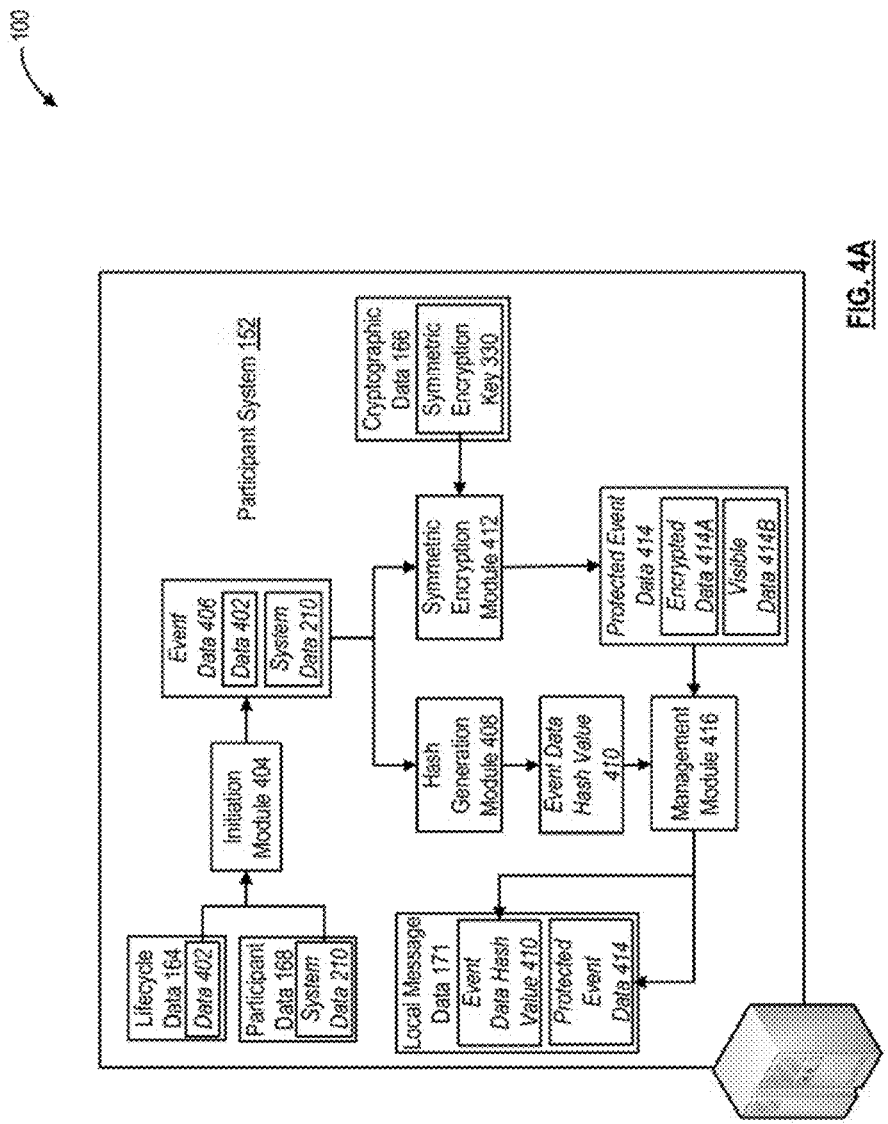

MANAGEMENT OF CRYPTOGRAPHICALLY SECURE EXCHANGES OF DATA USING PERMISSIONED DISTRIBUTED LEDGERS

TECHNICAL FIELD

The disclosed embodiments generally relate to computer-implemented systems and processes that manage a cryptographically secure generation and exchange of data using a permissioned distributed ledger.

BACKGROUND

Events within a lifecycle of a particular product, such as an EMV-compatible payment card, may include a generation of EMV-compatible root keys, a personalization of the EMV-compatible payment card to an account or an account holder, a shipment and a delivery of the EMV-compatible payment card to the account holder, and a decommissioning of the EMV-compatible payment card after expiration or comprise. Multiple network-connected systems operate to establish and manage these discrete events, individually or through collaboration with other systems.

SUMMARY

In some example, an apparatus includes a communications module, a tangible, non-transitory memory storing instructions, and at least one processor coupled to the communications module and the memory. The at least processor can be configured to execute the instructions to compute a first hash value based on event data associated with an occurrence of an event, and transmit a request to, and receive a response from, a first computing system across a communications network via the communications module. The request can cause the first computing system to execute instructions included within distributed ledger data, and the response can include a public cryptographic key of a second computing system. The at least processor can be further configured to execute the instructions to generate a symmetric encryption key based on the public cryptographic key of the second computing system, encrypt a first portion of the event data using the symmetric encryption key, and compute a second hash value based on the encrypted first portion of the event data and an unencrypted second portion of the event data. Further, the at least processor can also be configured to execute the instructions to generate message data that includes the encrypted and unencrypted portions of the event data and the computed first and second hash values, apply a first digital signature to the message data, and transmit, via the communications module, the message data and the applied first digital signature to a second communications system via a secure communications channel. The second computing system can be configured to generate elements of the distributed ledger data that confirm a validity of the message data. The generated elements of the distributed ledger data can include the encrypted first portion of the event data, the unencrypted second portion of the event data, the computed first and second hashes, the applied first digital signature, and a second digital signature applied to the message data by the second computing system.

In additional examples, an apparatus includes a communications module, a storage unit storing instructions, and at least one processor coupled to the communications module and the storage unit. The at least processor can be configured to execute the instructions to transmit a request to, and receive a response from, a first computing system across a first communications network via the communications module. The request can cause the first computing system to execute instructions included within distributed ledger data, and the response can include a public cryptographic key of a second computing system. The at least processor can also be configured to execute the instructions to receive, via the communications module, message data from the second computing system across a second communications network. The message data can include an encrypted first portion of event data, an unencrypted second portion of the event data, first and second hash values, and a first digital signature of the second computing system. Further, the at least processor can be configured to execute the instructions to generate a symmetric encryption key based on the public cryptographic key of the second computing system, compute a third hash value based on the encrypted first portion of event data and the unencrypted second portion of the event data, decrypt the encrypted first portion of the event data using the symmetric encryption key, compute a fourth hash value based on the decrypted first portion of the event data and the unencrypted second portion of the event data, and perform operations that verify an integrity of the received message data based on (i) a comparison of the first and the third hash values and (ii) a comparison of the second and the fourth hash values. In response to the verified integrity, the at least processor can be configured to execute the instructions to apply a second digital signature to the received message data, and the at least processor can be further configured to execute the instructions to generate elements of the distributed ledger data that confirm the validated integrity of the received message data. The elements of the distributed ledger data can include the encrypted first portion of the event data, the unencrypted second portion of the event data, the first and the second hash values, and the applied first and second digital signatures.

Further, in some examples, an apparatus includes a communications module, a storage unit storing instructions, and at least one processor coupled to the communications module and the storage unit. The at least processor can be configured to execute the instructions to generate event data associated with an occurrence of a lifecycle event, compute a first hash value based on the event data, encrypt a first portion of the event data using a symmetric encryption key, compute a second hash value based on the encrypted first portion of the event data and an unencrypted second portion of the event data. The at least processor can also be configured to execute the instructions to apply a digital signature to the encrypted first portion of the event data, the unencrypted second portion of the event data, and the computed first and second hash values, and to generate elements of distributed ledger data that confirm the occurrence of the lifecycle event. The elements of the distributed ledger data can include the encrypted first portion of the event data, the unencrypted second portion of the event data, the computed first and second hashes, and the applied digital signature.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

FIGS. 2, 3A, 3B, and 4A-4D illustrate portions of an exemplary computing environment, in accordance with the disclosed embodiments.

DETAILED DESCRIPTION

Figure 1:
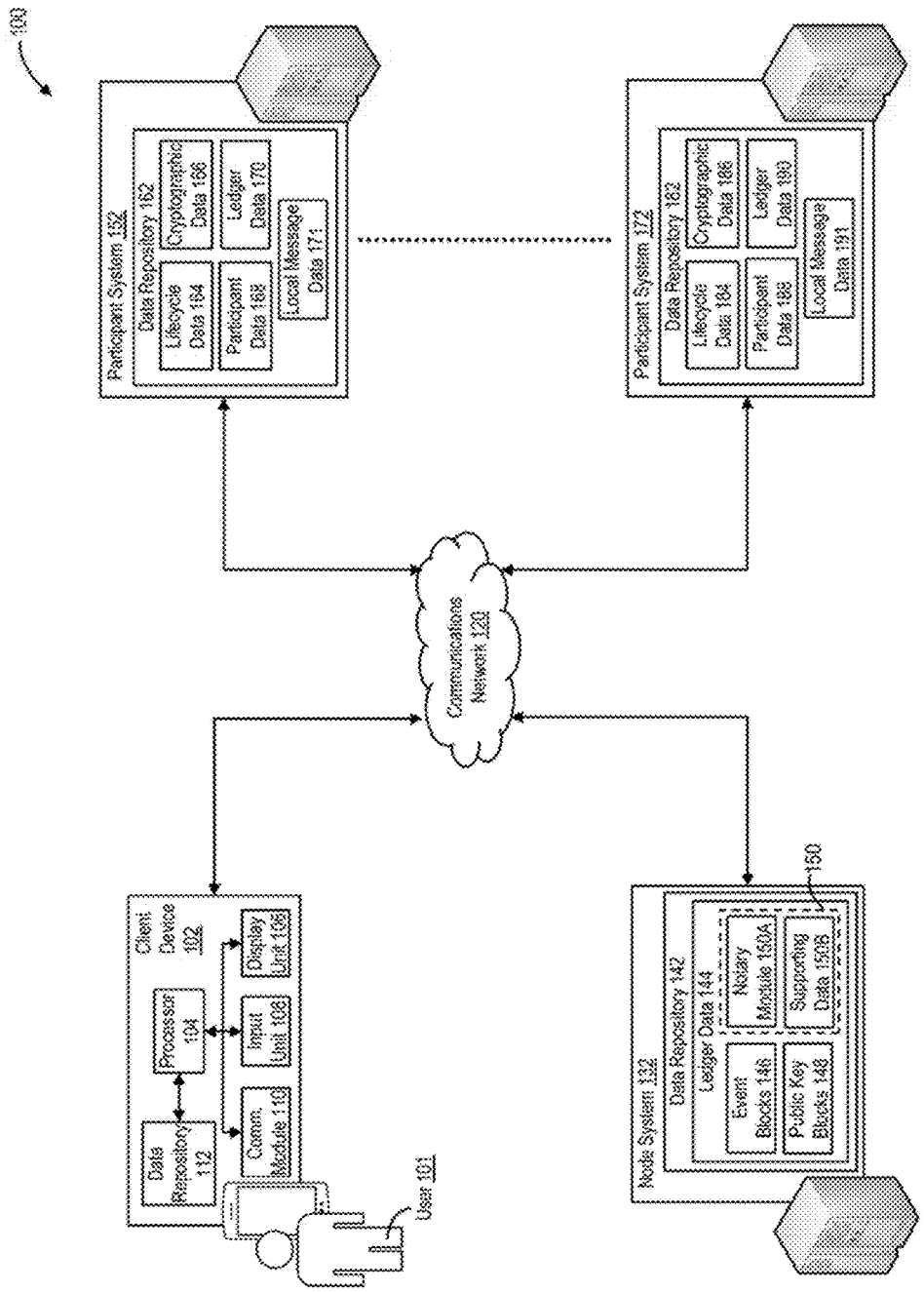
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

This specification describes exemplary, computer-implemented apparatuses, devices, and processes that, among other things, manage a cryptographically secure generation and exchange of data between network-connected systems using a permissioned distributed ledger. As described below, the permissioned distributed ledger may be accessible to a subset of the network-connected devices within a computing environment, e.g., "participant" systems, and as such, may establish a permissioned blockchain network within which the identity of each participant system is know each of the other participant systems. Further, and as described below, the cryptographically secure and immutable structure of the permissioned distributed ledger, such as a permissioned block-chain ledger, may establish a visible and accessible record of each portion of the data generated by, obtained by, or exchanged between the participant systems, while maintaining the confidentiality of sensitive portions of the generated, obtained, or exchanged data.

As described below, the generated, obtained, or exchanged data may include event data characterizing an occurrence of one or more discrete events that collectively establish a lifecycle of an executable application, an element of digital content, or a physical product issued, provided, or monitored by the participant systems. For example, the event data may characterize occurrences of discrete events within an issuance or operational lifecycle of a payment instrument, such as an EMV-compatible payment card. The EMV-compatible payment card may, in some instances, include a tamper-resistant integrated circuit having a microprocessor and one or more tangible, non-transitory memories that store a payment application compatible with EMV transaction authorization protocols and additional supporting data. One or more of the participant systems may perform operations that establish and manage discrete events that establish the lifecycle of the EMV-compatible payment card, and thus, may generate, obtain, or exchange portions of event data that characterizes these discrete events.

In some instances, the discrete events that establish the issuance or operational lifecycle of the EMV-compatible payment card may include issuer events, such as, but not limited to, an initial generation and distribution of a root cryptographic key of an issuer of the EMV-compatible payment application or payment card, and a specification (or modification) of account data associated with the EMV-compatible payment card. Examples of the specified or modified account data may include, not are not limited to, an account number, an expiration date, a card security code or value, an assigned PIN number, information identifying an underlying financial services account linked to the EMV-compatible payment card, and data identifying an account holder. Further, and by way of example, these exemplary operations, e.g., issuer operations, may be initiated or performed by one or more of the participant systems associated with the issuer of the EMV-compatible payment application or payment card.

The discrete events that establish the issuance or operational lifecycle of the EMV-compatible payment card may also include one or more personalization events. Examples of these personalization events include, but are not limited to, a generation of personalized cryptographic data for the EMV-compatible payment card and further, a storage of the personalized cryptographic data within corresponding portions of one or more tangible, non-transitory memories of the EMV-compatible payment card, along with portions of account data and one or more executable application programs. In some instances, these operations, e.g., personalization operations, may be initiated or performed by one or more systems associated with an entity, such as a personalization bureau, that perform the personalization operations on behalf of the issuer.

In some instances, the personalized cryptographic data can include, but is not limited to, a card-specific cryptographic key, such as a triple data encryption standard (3DES) key generated through an encryption of the account number using the issuer root cryptographic key distributed by the issuer system. The personalized cryptographic data can also include, but is not limited to, one or more RSA key pairs compatible with EMV-based transaction and authorization protocols and capable of encrypting data exchanged between the EMV-compatible payment card and a point-of-sale (POS) terminal, such as account data and PIN numbers.

Additionally, the discrete events that establish the issuance or operational lifecycle of the EMV-compatible payment card may include delivery events such as, but not limited to, a packaging of the personalized EMV-payment card, an initiation of a shipment of the packaged EMV-compatible payment card using an appropriate shipping service, and ultimately, a delivery the EMV-compatible card to the account holder at a specified address. In some instances, these operations, e.g., delivery operations, may be initiated or performed by one or more participant systems on behalf of the issuer or the personalization bureau.

The disclosed embodiments are also not limited to these examples of discrete events within the lifecycle of the EMV-compatible payment card. In some aspects, and consistent with the disclosed embodiments, one or more of the participant systems may perform operations, individually or collectively, that establish and manage additional or alternate discrete events within an issuance lifecycle of the EMV-compatible payment card, and further, discrete events within an operational lifecycle of the EMV-compatible payment card. For example, the discrete events within the operational lifecycle of the EMV-compatible payment card can include decommissioning events, such as, but not limited to, a decommissioning and a replacement of the EMV-compatible payment card in response to an expiration, a detection of fraud or compromise, or loss or damage. These operations, e.g., decommissioning operations, may be performed by one or more of the participant systems, such as the participant systems associated with the issuer or the personalization bureau.

As described above, one or more of the participant systems may perform any of the exemplary issuer, personalization, delivery, or decommissioning operations, either individually or collectively, to establish and manage discrete events within the issuance and operational lifecycle of the EMV-compatible payment card. In some instances, a single participant system may perform operations to manage an occurrence of a discrete event within the issuance or operational lifecycle of the EMV-compatible payment card. These operations may include, but are not limited to, personalization operations that generate RSA-based cryptographic key pairs for the EMV-compatible payment card (e.g., one of the discrete events in the issuance and operational lifecycle), store the RSA-based cryptographic key pair within the one or more tangible memories of the EMV-based payment card, and further, generate cryptographically secure representation of the generated RSA-based cryptographic key pair for inclusion within the updated block-chain ledger, as described below.

In other instances, the participant systems may collectively perform any of the exemplary issuer, personalization, delivery, or decommissioning operations to manage a discrete event based on portions of event data exchange across a communications network. For example, a first one of the participant systems may perform issuer operations that not only generate the issuer root key, but that also distribute the issuer root key to other participant systems within the computing environment. In other examples, the first participant system may perform additional operations that generate or modify account data associated with the EMV-compatible payment card, and as described above may transmit portions of the account data to the other participant systems, which perform any of the personalization, delivery, or decommissioning operations based on the transmitted account data portions.

To facilitate a progression of the discrete events within the lifecycle of the EMV-compatible payment card, the participant systems may establish one or more secure communications channels that facilitate a cryptographically secure exchange of event data between the participant systems. In certain aspects, the secure communication channel, once established, can maintain a confidentiality of sensitive portions of the exchanged data (e.g., the issuer root key, other private cryptographic keys, portions of the account information, etc.) and ensure that the sensitive portions of the exchanged data are visible to, and accessible by, only a permissioned subset of participant systems and other network-connected systems and devices operating within the computing environment.

In one example, the secure communications channel may be established based on a manual distribution of transport keys to each of the participant systems. Examples of the transport keys may include, but are not limited to, a symmetric key transport key that encrypts cryptographic keys (e.g., the issuer root key) generated by the participant systems through a performance of one or more issuer operations, a data transport key that encrypts portions of the sensitive account data (e.g., the account numbers, card security codes or values, expiration dates, or account holder data), and a PIN transport key that encrypts a PIN assigned to the EMV-compatible payment card by the participant systems. In certain instances, each of the transport keys may correspond to a symmetric encryption key generated in accordance with any of a number of symmetric key generation protocols, such as a Diffie-Hellman algorithm.

Further, in some examples, a centralized key management system trusted by each of the participant systems may generate each of the transport keys, and provision local copies of these transport keys to tangible, non-transitory memories within corresponding tamper-resistant, key management devices (e.g., a hardware security module). The key management devices, once provisioned with the transport keys, may be distributed manually to each of the participant systems (e.g., to the issuer, personalization, or delivery system), which may establish a direct wired connection with corresponding ones of the key management devices and access the locally provisioned transport keys.

For instance, upon accessing the locally provisioned transport keys, a participant system may perform issuer operations that encrypt the issuer root key using the key transport key, encrypt certain portions of the account data (e.g., the account number, the card security code or value, or the expiration data) using the data transport key, and encrypt the PIN assigned to the EMV-compatible payment card using the PIN transport key. The participant system may, in some examples, transmit the now-encrypted issuer master key, account data, and PIN across the communications network to one or more additional participant systems, which may perform personalization operations that decrypt the transmitted event data using corresponding ones of the locally provisioned transport keys, and generate additional card-specific information based on portions of the newly decrypted event data.

The manual distribution of tamper-resistant, key management devices, as provisioned with local transport keys, may facilitate a cryptographically secure exchange of data between the participant systems and ensure that the sensitive portions of the exchanged data are visible to, and accessible by, only the participant systems. The centralized provisioning of the transport keys to the tamper-resistant, key management devices, and the manual distribution of each of the provisioned key management devices to the permissioned participant systems within the computing environment, often represents a time- and computationally intensive process performed at an initial setup of each of the participant devices, especially where large number of permissioned participant device are added or removed from the computing environment.

Further, in the event that one or more of the transport keys are compromised or require update, these centralized, manual key management processes often provide no efficient mechanism to remotely re-provision the key management devices with updated transport keys. Instead, in response to the compromise or the required update, the centralized, manual key management processes may provision one or more additional key management devices with local copies of the updated transport keys, and manually distribute these newly provisioned key management devices to each of the participant systems within the computing environment. The temporal delay associated with the reprovisioning and manual distribution of the additional key management device may, in certain instances, delay a capability of one or more of the participant systems to establish or manage discrete events within the lifecycle of the EMV-compatible payment card, and may delay the progression of the events within the lifecycle.

Additionally, the manual distribution of these key management devices to the permissioned, participant systems, and thus, the manual distribution of the transport keys, often fails to provide a mechanism for tracking a status of a particular event within the lifecycle of the EMV-compatible payment card. For example, a participant system may receive, from a device operated by a customer, query data regarding a status of a newly requested EMV-payment card. In response to the received query data, the participant system may perform issuer operations that encrypt sensitive portions of the query data (e.g., account data, etc.) using an appropriate one of the locally provisioned transport keys, and broadcast the encrypted query data across the communications network to each of the other participant systems, which may process the encrypted query data and return a response indicative of a status of one or more discrete events within the operational lifecycle of the newly requested, EMV-compatible payment card. The broadcasting of the encrypted query data to each permissioned participant system consumes not only network bandwidth, but also computational resources of the participant systems, which must decrypt the encrypted query data and provide a response indicative of the corresponding event status. Further, repeated broadcasts of encrypted query data may, in some instances, increase an opportunity for fraudulent activity by malicious actors operating within the computing environment.

In some embodiments, described below, a cryptographically secure, immutable, and permissioned distributed ledger, such as the permissioned block-chain ledger described herein, may include ledger blocks that establish a visible and accessible record of each portion of event data generated by, obtained by, or exchanged between the participant systems, while maintaining the confidentiality of sensitive portions of the generated, obtained, or exchanged data. As each portion of the event data may also include a unique identifier of the EMV-compatible payment card, the visible and accessible record maintained by the permissioned block-chain ledger may also establish a cryptographically secure and immutable record of a time-evolution of occurrences of discrete events within the issuance or operations lifecycle of the EMV-compatible payment card (e.g., which are characterized by the maintained portions of the event data).

As described below, the permissioned block-chain ledger may also maintain, within one or more of ledger blocks, elements of code (e.g., executable code modules, executable scripts, etc.) and supporting data that, when executed by one or more permissioned, network-connected systems (e.g., "nodes" of the permissioned, block-chain network), collectively establish a distributed "smart" contract within the permissioned block-chain ledger. In some embodiments, upon execution of the code elements, the one or more permissioned, network-connected systems may perform operations that securely and immutable maintain public cryptographic keys generated by each of the participant systems within one or more ledger blocks of the block-chain ledger.

For example, through a performance of any of the exemplary issuer, personalization, delivery, or decommissioning operations described above, a first participant system may exchange sensitive event data with a second participant system across a corresponding communications network. For example, prior to initiating the exchange of the sensitive event data, the first participant system may perform operations that broadcast a request to obtain a public cryptographic key of the second participant system to the one or more node systems (e.g., which includes a unique identifier of the distributed smart contract, such as a contract public key). The second participant system may also broadcast, to the one or more mode systems, a similar request to obtain a public cryptographic key of the first participant system.

In certain aspects, described herein, the one or more node systems may receive the broadcasted requests from the first and second participants systems, and may execute the code elements maintained within the permissioned block-chain ledger to provide the requested public cryptographic key of the second participant system to the first participant system, and to return the requested public cryptographic key of the first participant system to the second participant system, along with cryptographic data, such as a digital signature, and confirms a validity of the corresponding public cryptographic key. Based on the data received from the one or more nodes (e.g., through the execution of code elements that establish the distributed smart contract), each of the first and second participant systems may perform operations that generate locally a symmetric encryption key based on respective ones of the received public cryptographic keys.

These locally generated symmetric encryption keys may establish the secure communications channel between the first and second participant systems, and facilitate a cryptographically secure transmission of the sensitive event data from the first participant system to the second participant system. Certain of the exemplary, computer-implemented processes described herein, which facilitate establish secure communications sessions between participant systems based on locally generated symmetric encryption keys, may be implemented in addition to or as an alternate to conventional key distribution processes, which centrally provision tamper-resistant, key management devices with local copies of the symmetric transport keys and manually distribute the provisioned key management devices to the permissioned system.

In additional embodiments, as described below, a participant system may also broadcast, to the one or more nodes of the permissioned block-chain network, a query message requesting a current status of the EMV-compatible payment card within its issuance and operational lifecycle (e.g., and including a unique identifier of the distributed smart contract, such as a contract public key). As described herein, the one or more node systems may receive the broadcasted query message from the participant system, and may execute the code elements maintained within the permissioned block-chain ledger to parse the ledger blocks maintaining data characterizing the discrete events within the issuance and operational lifecycle of the EMV-compatible payment card (e.g., "event" ledger blocks), and in real-time, identify portions of the maintained data that characterize a current lifecycle status of the EMV-compatible payment card.

The one or more node systems may return the identified lifecycle status data to the participant system (e.g., as a response to the query message), and the participant system may relay portions of the lifecycle status data to a client device associated with a holder of the EMV-compatible payment card, as described below. Certain of the exemplary, computer-implemented processes described herein, which facilitate a real-time status inquiry managed by a distributed smart contract maintained within a permissioned block-chain ledger and based on event data immutably stored within that permissioned block-chain ledger, may be implemented in addition to or as an alternate to conventional processes, which determine a current status of an EMV-compatible payment card based on discrete queries transmitted to, and processed by, each system participating in the issuance or operational lifecycle of the EMV-compatible payment card.

I. Exemplary Computing Environments

FIG. 1 is a diagram illustrating an exemplary computing environment 100, consistent with certain disclosed embodiments. As illustrated in FIG. 1, environment 100 may include a client device 102, one or more node systems, such as node system 132, and one or more participant systems, such as participant system 152 and 172, each of which may be interconnected through any combination of communications networks, such as network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In an embodiment, client device 102 may include a computing device having one or more tangible, non-transitory memories that store data and/or software instructions, and one or more processors, e.g., processor 104, configured to execute the software instructions. The one or more tangible, non-transitory memories may, in some aspects, store software applications, application modules, and other elements of code executable by the one or more processors, such as a web browser or a mobile application associated with participant systems 152 or 172. Client device 102 may also establish and maintain, within the one or more tangible, non-transitory memories, one or more structured or unstructured data repositories or databases, e.g., data repository 112.

Further, as illustrated in FIG. 1, client device 102 may also include a display unit 106 configured to present interface elements to user 101, and an input unit 108 configured to receive input from user 101, e.g., in response to the interface elements presented through display unit 106. By way of example, display unit 106 may include, but is not limited to, an LCD display unit or other appropriate type of display unit, and input unit 108 may include, but input not limited to, a keypad, keyboard, touchscreen, voice activated control technologies, or appropriate type of input device. Further, in additional aspects (not depicted in FIG. 1), the functionalities of display unit 106 and input unit 108 may be combined into a single device, e.g., a pressure-sensitive touchscreen display unit that presents interface elements and receives input from user 101. Client device 102 may also include a communications module 110, such as a wireless transceiver device, coupled to processor 104 and configured by processor 104 to establish and maintain communications with network 120 using any of the communications protocols described herein.

Examples of client device 102 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on an interface module, consistent with disclosed embodiments. In some instances, user 101 may operate client device 102 and may do so to cause client device 102 to perform one or more operations consistent with the disclosed embodiments.

Referring back to FIG. 1, node system 132 and participant systems 152 and 172 may each represent a computing system that includes one or more servers and tangible, non-transitory memory devices storing executable code and application modules. The servers may, for example, each include one or more processor-based computing devices, which may be configured to execute portions of the stored code or application modules to perform operations consistent with the disclosed embodiments. In some instances, and consistent with the disclosed embodiments, one or more of node system 132 and participant systems 152 and 172 may correspond to a distributed system that includes computing components distributed across one or more networks, such as network 120, or other networks, such as those provided or maintained by cloud-service providers.

In some instances, node system 132 may establish and maintain, within the one or more tangible, non-tangible memories, one or more structured or unstructured data repositories or databases, such as data repository 142. In certain aspects, data repository 142 may include ledger data 144 that maintains a local copy of a cryptographically secure distributed-ledger data structure, such as the permissioned block-chain ledger described above. For example, the permissioned block-chain ledger may include one or more ledger blocks that immutably record and track occurrences of events within an issuance and operational lifecycle of an EMV-compatible payment card (e.g., event ledger blocks 146), and one or more ledger blocks that maintain immutable copies of public cryptographic data generated by each participant system (e.g., participant systems 152 and 172) that participates in the permissioned block-chain ledger (e.g., public key ledger blocks 148). For example, public key ledger blocks 148 may maintain public cryptographic keys generated by participant systems 152 and 172 and other participant systems operating within environment 100.

In additional instances, the permissioned block-chain ledger may also include one or more ledger blocks that maintain executable elements of code, such as software modules or executable scripts, that, when executed by the node system 132 in conjunction with supporting data, perform operations consistent with a distributed smart contract (e.g., smart contract ledger blocks 150). By way of example, smart contract ledger blocks 150 may include a notary module 150A that, when executed by node system 132 (e.g., by one or more processors or through an instantiated virtual machine), performs operations that securely manage the maintenance and distribution of portions of the public cryptographic data stored within the permissioned block-chain ledger, e.g., within public key ledger blocks 148.

Smart contract ledger blocks 150 may also include data 150B that supports the maintenance and distribution operations performed by notary module 150A. Examples of supporting data 150B may include, but are not limited to: data identifying those systems that participate in the permissioned block-chain ledger and this, that participate in the distributed smart contract (e.g., IP addresses or MAC addresses of participant systems 152 and 172); a public cryptographic key associated with the distributed smart contract, which may be provided to each of the participant systems; and a private cryptographic key leveraged by notary module 150A to digitally sign generated or output data.

As illustrated in FIG. 1, participant system 152 may also establish and maintain, within the one or more tangible, non-tangible memories, one or more structured or unstructured data repositories or databases, such as data repository 162. By way of example, data repository 162 may include, but is not limited to, lifecycle data 164, cryptographic data 166, participant data 168, ledger data 170, and local message data 171.

In some aspects, lifecycle data 164 may include data that characterizes one or more discrete events within the lifecycle of the EMV-compatible payment card that are established or managed by participant system 152. For example, and as described herein, participant system 152 may perform issuer operations that establish or manage certain issuer events within the lifecycle of the EMV-compatible payment card, such as a generation of an EMV-compatible issuer root key or the generation or maintenance of portions of account data that characterizes the EMV-compatible payment card (e.g., an account number, expiration data, card-security code or value, PIN number, or account-holder information). Participant system 152 may perform operations that store data characterizing these issuer events, such as the EMV-compatible issuer root key of the account data, within corresponding portions of lifecycle data 164.

In other examples, described herein, participant system 152 may perform operations that establish or manage certain personalization events within the lifecycle of the EMV-compatible payment card. Examples of these personalization events include, but are not limited to: the receipt of data characterizing certain issuer events from an issuer system (e.g., the EMV-compatible issuer root key, the account data, etc.); the generation of personalized, card-specific cryptographic data (e.g., EMV-compatible symmetric cryptographic keys derived from the EMV-compatible issuer root key, RSA-based public and private keys associated with the EMV-compatible payment card, etc.); and the cryptographically secure storage of the personalizes cryptographic data, the account data, and an EMV-compatible payment application within one or more tangible, non-transitory memories of the EMV-compatible payment card. In some instances, participant system 152 may perform operations that store data characterizing these and other personalization events within corresponding portions of lifecycle data 164.

The disclosed embodiments are, however, not limited to these examples of lifecycle events. In other aspects, participant system 152 may perform operations that establish and manage an occurrence of any additional or alternate event within the issuance or operational lifecycle of the EMV-compatible payment card, such as an occurrence of a delivery event related to the shipment of a personalized EMV-compatible payment card and eventual delivery to an address specified by the customer, or a decommissioning of the EMV-compatible payment card in response to a detected expiration or instance of fraud. Further, participant system 152 may perform operations that store, within lifecycle data 164, any additional or alternate data characterizing the occurrences of events within the issuance or operational lifecycle of the EMV-compatible payment card, such as, but not limited to, the characterizing the issuer, personalization, delivery, or decommissioning events described above.

Referring back to FIG. 1, cryptographic data 166 may include, among other things, an RSA-based, cryptographic key pair generated participant system 152 using any of a number of appropriate key-generation protocols and processes. Cryptographic data 166 may also include data specifying one or more additional public cryptographic keys (e.g., counterparty public keys) generated by other participant systems within environment 100 (e.g., counterparty systems) and further, symmetric encryption keys derived from the corresponding ones of the counterparty public keys. Participant system 152 may perform any of the exemplary processes described herein to obtain the counterparty public keys and generate the corresponding symmetric encryption keys, which, in some aspects, may facilitate real-time, secure communications between participant systems 152 and 172 (and other counterparty participant systems) without the manual distribution of hardware-provisioned local transport keys common in many conventional key-management protocols.

In other aspects, participant system data 168 may include data that identifies each of the participant and node systems capable of accessing the permissioned block-chain ledger and participating in the distributed smart contract, as described above. The participant and node systems may, in some instances, also perform operations that, individually or collectively, establish or manage occurrences of discrete events within the issuance and operational lifecycle of the EMV-compatible payment card. For example, participant system data 168 may include an identifier of each of the participant and node systems, such as an IP address, MAC address, or other data that uniquely identifies each of the participant and node systems within environment 100. Additionally, in some instances, participant system data 168 may also maintain data (e.g., an IP address, MAC address, etc.) that uniquely identifies participant system 152 within environment 100.

Ledger data 170 may, for example, may include portions of a latest, longest version of the permissioned block-chain ledger described above. Additionally, ledger data 170 may also include data that uniquely identifies the distributed smart contract maintained within the permissioned block-chain ledger (e.g., the public cryptographic key of the distributed smart contract) and specifies protocols for invoking or initiating an execution of the distributed smart contract. For example, when included in data broadcasted to one or more node systems operating within environment (e.g., node system 132), the identification and protocol data may cause the one or more node systems to access and initiate an execution of the code elements associated with the distributed smart contract (e.g., notary module 150A, described above) in accordance with portions of the broadcasted data and supporting data maintained within the permissioned block-chain ledger (e.g., supporting data 150B, described above).

Local message data 171 may include, but is not limited to, data specifying one or more intermediate outputs of the exemplary processes described below. For example, and as described in greater detail below, participant system may access portions the stored intermediate output data for subsequent processing and transmission to other node and participant systems operating within environment 100, such as node system 132 and participant system 172.

Additionally, as illustrated in FIG. 1, participant system 172 may also establish and maintain, within the one or more tangible, non-tangible memories, one or more structured or unstructured data repositories or databases, such as data repository 182. By way of example, data repository 182 may include, but is not limited to, event data 184, cryptographic data 186, participant system data 188, ledger data 190, and local message data 191. In certain aspects, each of event data 184, cryptographic data 186, participant data 188, ledger data 190, and local message data 191 may include data similar to that described above in reference corresponding ones of lifecycle data 164, cryptographic data 166, participant data 168, ledger data 170, and local message data 171, e.g., as maintained within data repository 162.

II. Exemplary Computer-Implemented Processes for Establishing and Managing Occurrences of Discrete Lifecycle Events using Cryptographically Secure and Permissioned Distributed Ledgers In some embodiments, one or more network-connected systems, such as node system 132 and participant systems 152 and 172, can perform operations that establish and manage occurrences of discrete events within a lifecycle of a particular product, executable application, or element of digital content. For example, as described herein, participant systems 152 and 172 (and other computing devices within environment 100) may perform issuer, personalization, delivery, or decommissioning operations that, collectively or individually, establish and manage occurrences of discrete events within the issuance and operational lifecycle of an EMV-compatible payment card.

Further, each of node system 132 and participant systems 152 and 172 may access a cryptographically secure, distributed-ledger data structure, such as the permissioned block-chain ledger described above, that immutably maintains event data characterizing the occurrences of each of the discrete events within the issuance and operational lifecycle of an EMV-compatible payment card. For example, the event data associated with each of the occurrences of the discrete events (e.g., as maintained within one or more ledger blocks of the permissioned block-chain ledger) may be linked to a unique identifier of the EMV-compatible payment card, such as a public cryptographic key associated with the EMV-compatible payment card. By associating each element of event data with the unique identifier within the permissioned block-chain ledger, the disclosed embodiments may facilitate real-time queries regarding the status of the EMV-compatible payment card within its issuance or operational lifecycle based on portions of the permissioned block-chain ledger, as described below.

Further, and as described above, node system 132 and participant systems 152 and 172 may collectively establish a permissioned block-chain network based on a mutual capability or permission to access the permissioned block-chain ledger. Within the permissioned block-chain network, data that uniquely identifies each of node system 132 and participant systems 152 and 172 (and other node or participant systems operating in environment 100) may be shared among each member system of the permissioned block-chain network and maintained locally by each member of the permissioned block-chain network (e.g., as participant data 168 and/or participant data 188 of FIG. 1).

Additionally, as described herein, the permissioned block-chain ledger may maintain, within one or more ledger blocks, elements of executable code and supporting data that collectively establish a distributed smart contract. In some aspects, the distributed smart contract, when executed by one or more node systems operating within environment 100 (or by instances of a distributed virtual machine provisioned to these node systems), may perform operations for securely managing a maintenance and distribution of public cryptographic data generated by each member of the permissioned block-chain network that participates in the issuance or operational lifecycle of the EMV-compatible payment card.

For example, participant systems 152 and 172 may each generate a public cryptographic key (e.g., using RSA-based or other appropriate key generation algorithms), and may provide that generated public cryptographic key to the one or more node systems as inputs to the distributed smart contract. As described in greater detail below, the one or more node systems (e.g., node system 132) may execute the code elements associated with the distributed smart contract to verify that both participant systems 152 and 172 are members of the permissioned block-chain network, and in response to a successful verification, generate data associating the each of the public cryptographic keys with a corresponding unique system identifier, such as an IP address or a MAC address of participant systems 152 or 172. The one or node systems may perform additional operations that generate an updated version of the permissioned block-chain ledger that stores an immutable and cryptographically secure representation of the public cryptographic keys and the associated system identifiers within one or more ledger blocks.

To facilitate a progression through the issuance or operational lifecycle of the EMV-compatible payment card, participant system 152 may be configured to exchange potentially sensitive data with participant system 172 (or with other participant systems within environment 100). For example, as described herein, participant system 152 may perform operations that generate an EMV-compatible issuer root key, and participant system 152 may be configured to transmit the generated EMV-compatible issuer root key to participant system 172. Based on the received data, participant system 172 may perform personalization operations that generate personalized card-specific cryptographic data based on the EMV-compatible issuer root key and that store portions of the personalized cryptographic data within the one or more tangible, non-transitory memories of the EMV-compatible payment card (e.g., along with additional account information or payment applications received from participant system 152 or other participant systems in environment 100).

In some aspects, as the EMV-compatible issuer root key may represent sensitive data visible to only a subset of the permissioned block-chain network, and participant systems 152 and 172 may perform operations that establish a secure communications channel that facilitate the cryptographically secure exchange of the EMV-compatible issuer root key. For example, participant system 152 may perform operations that request, from the distributed smart contract, data identifying the public cryptographic key of participant system 172, and participant system 172 may perform similar operations that request data identifying the public cryptographic key of participant system 152 from the distributed smart contract.

The one or more node systems, e.g., node system 132, may execute the code elements associated with the distributed smart contract to verify that both participant systems 152 and 172 are members of the permissioned block-chain network. The one or more node systems may then access and retrieve corresponding ones of the requested public cryptographic keys, which may be returned to participant systems 152 and 172 across network 120, along with corresponding digital signatures that verify the authenticity of the public cryptographic keys.

Participant systems 152 and 172 may each perform operations that derive locally a symmetric encryption key from corresponding ones of the transmitted public cryptographic keys, and through the locally generated symmetric transport keys, participant systems 152 and 172 may establish a secure communications channel across network 120 and exchange a cryptographically secure representation of the sensitive issuer root key. As described above, these exemplary computer-implemented processes, which establish a secure communications channel between participant systems 152 and 172 based on locally generated symmetric encryption keys, may be implemented in addition to or as an alternate to conventional key distribution processes, which centrally provision tamper-resistant, key management devices with local copies of the symmetric transport keys and manually distribute the provisioned key management devices to participant systems 152 and 172.

a. Computer-Implemented Processes for Establishing Secure Communications Channels Using Cryptographically Secure and Permissioned Distributed-Ledger Data Structures In some examples, each participant system within the permissioned block-chain network, e.g., participant systems 152 and 172, may generate a public cryptographic key and may provide that generated public cryptographic key to the one or more node systems as inputs to a distributed smart contract. As described in reference to FIG. 2, the one or more node systems, e.g., node system 132, may execute the code elements associated with the distributed smart contract to verify that the participant systems are members of the permissioned block-chain network, and in response to a successful verification, perform operations to generate an updated version of the permissioned block-chain ledger that stores an immutable and cryptographically secure representation of the public cryptographic keys and associated system identifiers within one or more ledger blocks.

Figure 2:
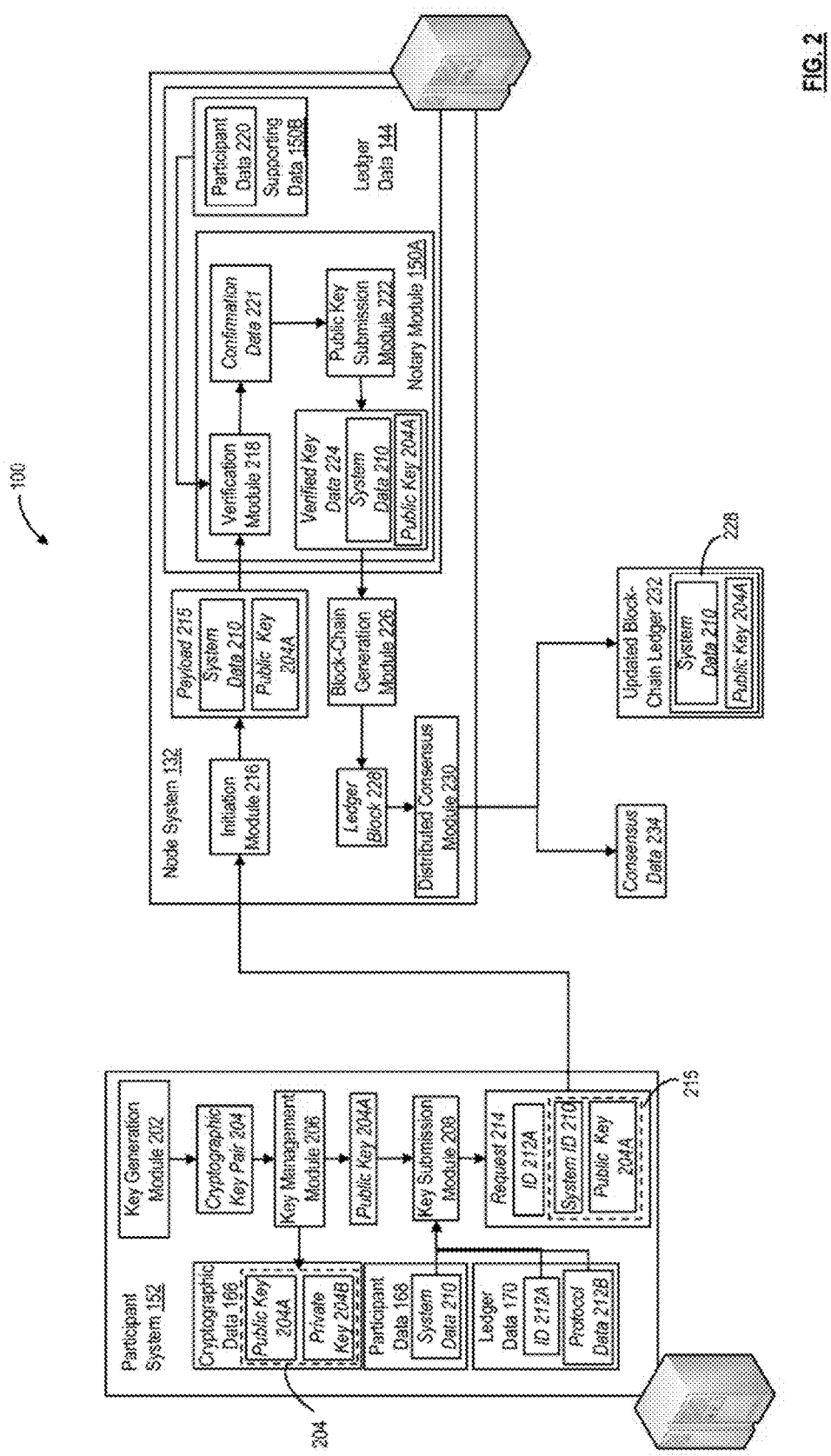

Referring to FIG. 2, participant system 152 may execute a key generation module 202, which generates and outputs a cryptographic key pair 204. In some examples, cryptographic key pair 204 may include a public component, e.g., public cryptographic key 204A, and a private component, e.g., private cryptographic key 204B, Further, key generation module 202 may generate cryptographic key pair 204 using any appropriate key generation protocol, which includes, but is not limited to an RSA key generation algorithm.

Further, when executed by participant system 152, a key management module 206 may receive cryptographic key pair 204 and perform operations that store cryptographic key pair 204 within the one or more tangible, non-transitory memories, e.g., within cryptographic data 166 of data repository 162. Key management module 206 may also provide public cryptographic key pair 204 as an input to a key submission module 208, which may generate data that submits public cryptographic key 204A to the distributed smart contract for inclusion within one or more blocks of the permissioned block-chain ledger, as described below.

For example, when executed by participant system 152, key submission module 208 may receive public cryptographic key 204A, and may retrieve system data 210 that uniquely identifies participant system 152 within environment 100 from the one or more tangible non-transitory memories, e.g., from participant data 168 of data repository 162. As described above, system data 210 may include a unique system identifier of participant system 152, such as an IP address or a MAC address. Further, key submission module 208 may also retrieve a contract identifier 212A that uniquely identifies the distributed smart contract within the permissioned block-chain ledger and protocol data 212B associated with the distributed smart contract from the one or more tangible non-transitory memories, e.g., from ledger data 170 of data repository 162. In some instances, and as described herein, contract identifier 212A may include a public cryptographic key assigned to or generated by the distributed smart contract, and protocol data 212B may include data characterizing a format of a data that, when received and processed by the one or more node systems, causes these one or more node systems to invoke the distributed smart contract and execute the code elements that establish the distributed smart contract.

In some aspects, key submission module 208 may generate a key submission request 214, which may be formatted in accordance with retrieved protocol data 212B. For example, key submission request 214 may include contract identifier 212A, which uniquely identifies the distributed smart contract within the permissioned block-chain ledger, and a payload 215, which includes, but is not limited to, system data 210 and public cryptographic key 204A. The disclosed embodiments are not limited to submission requests that include these exemplary components or formatting schemes, and in other aspects, submission request 214 may include any additional or alternate data, formatted in accordance with any additional or alternate formatting scheme, that would be appropriate to participant system 152, the one or more node systems, and to the distributed smart contract.

Participant system 152 may then broadcast submission request 214 across network 120 to the one or more node systems using any appropriate communications protocol. Each of the one or more node systems may receive a broadcasted copy of submission request 214, and may perform any of the processes described herein to verify that participant system 152 is a participant in the permissioned block-chain network, and in response to a successful verification, to perform operations that incorporate the public cryptographic key pair 204 and system data 210 into a one or more new ledger blocks of the permission block-chain ledger through distributed consensus.

By way of example, as illustrated in FIG. 2, node system 132 may receive submission request 214, and an initiation module 216 may process submission request 214 to detect a presence of contract identifier 212A, which uniquely identifies the distributed smart contract within the permissioned block-chain ledger. In some aspects, and in response to the detection of contract identifier 212A, initiation module 216 may perform operations that invoke the distributed smart contract and thus, the execution of the code elements that establish the distributed smart contract, e.g., as maintained in notary module 150A of smart contract ledger blocks 150. In some instances, one or more processors of node system 132 may access the permissioned block-chain ledger (e.g., as maintained within ledger data 144 of data repository 142) and execute the code elements maintained within notary module 150A. In other instances, and consistent with the disclosed embodiments, node system 132 may execute an instance of a distributed virtual machine, which accesses the permissioned block-chain ledger and executes the code elements maintained within notary module 150A (e.g., based on output data generated by initiation module 216).

Upon invocation of the distributed smart contract, initiation module 216 may extract payload 215 from submission request 214, and provide payload 215 as an input to notary module 150A, which includes the executable code elements that establish the distributed smart contract. For example, a verification module 218 of notary module 150A may receive payload 215, and perform operations that verify participant system 152 is a participant in the permissioned block-chain network and possess a requisite permission to access the distributed smart contract. For example, verification module 218 may access participant data 220 specifying the unique identifiers of the participant systems of the permissioned block-chain network (e.g., as maintained within supporting data 150G of smart contract ledger blocks 150). Verification module 218 may also process payload 215 to extract system data 210, which uniquely identifies participant system 152, and compare system data 210 against participant data 220 to verify the participation of participant system 152 within the permissioned block-chain network.

In one aspect, if participant data 220 fails to include the system identifier of participant system 152, verification module 218 may determine that participant system 152 is not a participant in the permissioned block-chain network. In response to this determination, the distributed smart contract may decline to record the public cryptographic key of participant system 152 within the permissioned block-chain ledger, and notary module 150A may output data indicative of the unsuccessful verification, which node system 132 may relay back to participant system 152.

Alternatively, if participant data 220 were to include the system identifier of participant system 152, verification module 218 may verify that participant system 152 is a participant in the permissioned block-chain network, and may output confirmation data 221 indicative of the successful verification. In some instances, confirmation data 221 may also include system data 210 (e.g., which uniquely identifies participant system 152 within environment 100) and public cryptographic key 204A, and verification module 218 may provide confirmation data 221 as an input to a public key submission module 222, which may process portions of confirmation data 221 for submission to the permissioned block-chain ledger.

For example, public key submission module 222 may process confirmation data 221 to extract system data 210 and public cryptographic key 204A, and may perform operations to generate verified key data 224 that includes and links together system data 210 and public cryptographic key 204A. Verified key data 224 may, for example, represent an output of the distributed smart contract, and in some aspects, notary module 150A may output verified key data 224 to a block-chain generation module 226 of node system 132. For example, block-chain generation module 226 may perform operations that generate a new ledger block 228 that includes public cryptographic key 204A and that associates public cryptographic key 204A with the unique identifier of participant system 152, e.g., system data 210.

Node system 132 may perform additional operations that append to ledger block 228 to a prior version of the permissioned block-chain ledger to generate a latest, longest version of the permissioned block-chain ledger (e.g., an updated permissioned block-chain ledger 232). For example, the additional operations may be established through a distributed consensus among the other node systems operating within environment 200, and may include, but are not limited to, the calculation of an appropriate proof-of-work or proof-of-stake by a distributed consensus module 230 prior to the other node systems. In certain aspects, node system 132 may broadcast evidence of the calculated proof-of-work or proof-of-stake to the other node systems across network 120 (e.g., as consensus data 234).

Node system 132 may also broadcast updated permissioned block-chain ledger 232, which represents the latest, longest version of the permissioned block-chain ledger, to the other node systems operating within environment 100 and additionally or alternatively, to each of the network-connected systems that participate in the permissioned block-chain network, such as participant systems 152 and 172. As illustrated in FIG. 1, updated permissioned block-chain ledger 232 may include new ledger block 228, which provides cryptographically secure data identifying the public cryptographic key of participant system 152 (e.g., public cryptographic key 204A) and linking that public cryptographic key to data uniquely identifying system 152 within environment 100 (e.g., system data 210).

In additional aspects, to facilitate a progression through the issuance or operational lifecycle of the EMV-compatible payment card, participant system 152 may be configured to exchange potentially sensitive data with a counterparty participant system operating within environment 100, such as participant system 172. As described below in reference to FIGS. 3A and 3B, participant systems 152 and 172 may perform operations to establish a secure communications channel that facilitates a cryptographically secure transmission of the potentially sensitive data from participant system 152 to participant system 172. For example, participant system 152 may perform operations that request, from the distributed smart contract, data identifying the public cryptographic key of participant system 172, and participant system 172 may perform similar operations that request data identifying the public cryptographic key of participant system 152 from the distributed smart contract.

The one or more node systems, e.g., node system 132, may execute the code elements associated with the distributed smart contract to access and retrieve corresponding ones of the requested public cryptographic keys, which the one or more node systems may transmit to participant systems 152 and 172 across network 120, along with corresponding digital signatures that verify the authenticity of the public cryptographic keys. Further, and as described below, participant systems 152 and 172 may each perform operations that generate locally a symmetric transport key from corresponding ones of the transmitted public cryptographic keys, and through the locally generated symmetric transport keys, participant systems 152 and 172 may establish a secure communications channel across network 120.

Figure 3A:
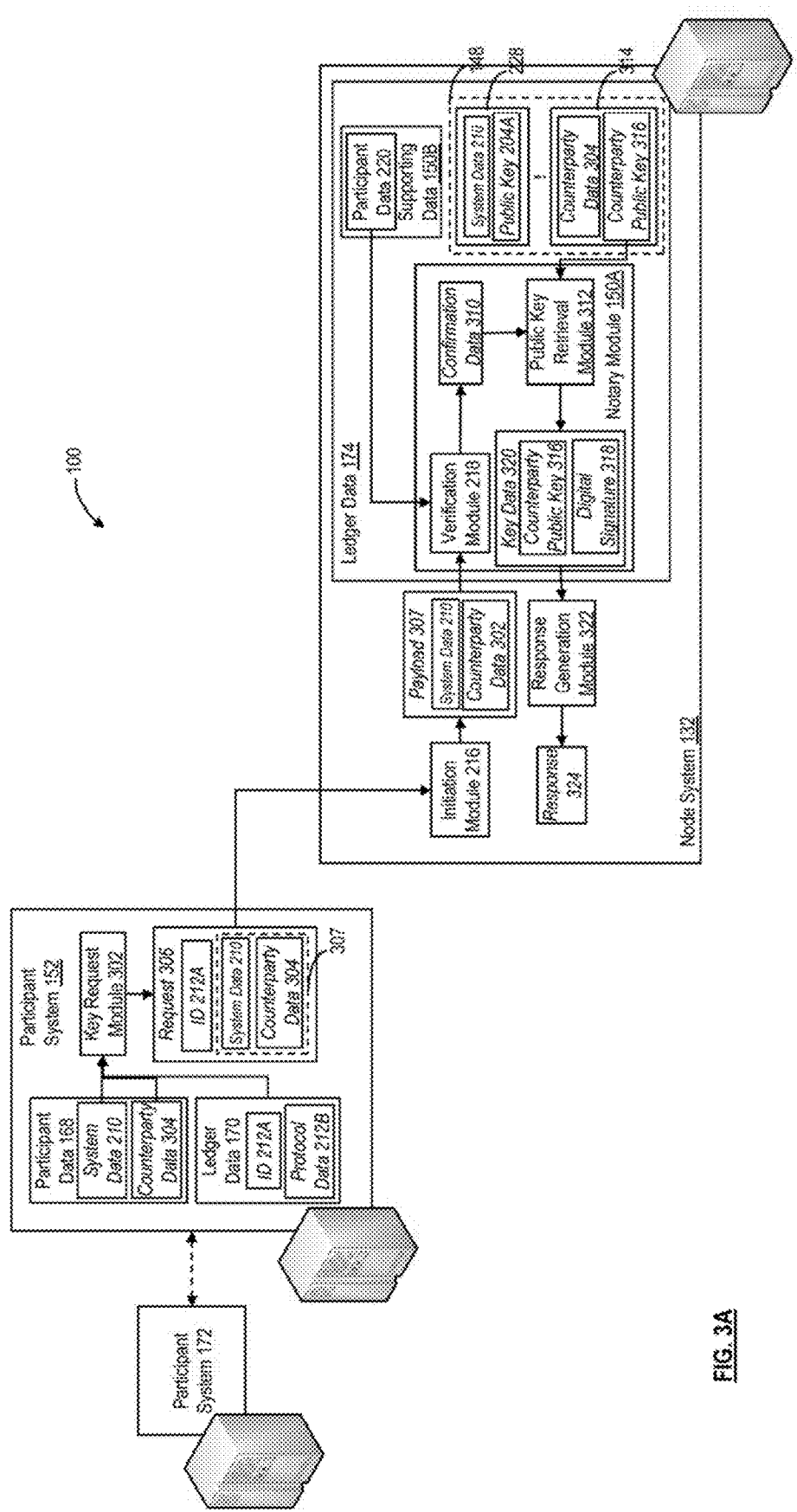

Referring to FIG. 3A, participant system 152 may be configured to perform operations that request, from the distributed smart contract, data identifying the public cryptographic key of the counterparty system, e.g., participant system 172. For example, when executed by participant system 152, a key request module 302 may access a portion of the one or more tangible, non-transitory memories, such as participant data 168 of data repository 162. Key request module 302 may perform operations that extract, from participant data 168, system data 210 that uniquely identifies participant system 152 within environment 100, and counterparty data 304 that uniquely identifies the counterparty system within environment 100, e.g., participant system 172. As described above, data 210 and 304 may include respective system identifiers for participating systems 152 and 172, such as IP addresses of MAC addresses.

In some instances, key request module 302 may also retrieve a contract identifier 212A that uniquely identifies the distributed smart contract within the permissioned block-chain ledger and protocol data 212B associated with the distributed smart contract from the one or more tangible non-transitory memories, e.g., from ledger data 170 of data repository 162. As described herein, contract identifier 212A may include a public cryptographic key assigned to or generated by the distributed smart contract, and protocol data 212B may include data characterizing a format of data that, when received and processed by the one or more node systems, causes these one or more node systems to invoke the distributed smart contract and execute the code elements that establish the distributed smart contract.

In some aspects, key request module 302 may generate a key retrieval request 306, which may be formatted in accordance with retrieved protocol data 212B. For example, key retrieval request 306 may include contract identifier 212A, which uniquely identifies the distributed smart contract within the permissioned block-chain ledger, and a payload 307, which includes, but is not limited to, system data 210 and counterparty data 304. The disclosed embodiments are not limited to key retrieval requests that include these exemplary components or formatting schemes, and in other aspects, key retrieval request 306 may include any additional or alternate data, formatted in accordance with any additional or alternate formatting scheme, that could be appropriate to participant system 152, the one or more node systems, and to the distributed smart contract.

Participant system 152 may then broadcast key retrieval request 306 across network 120 to the one or more node systems using any appropriate communications protocol. Each of the one or more node systems may receive a broadcasted copy of key retrieval request 306, and may perform any of the processes described herein to verify that participant system 152 is a member of the permissioned block-chain network, and in response to a successful verification, to perform operations that access ledger blocks of the permissioned block-chain ledger, obtain a public cryptographic key associated with the counterparty data 304 within the accessed ledger blocks, and return the obtained public cryptographic key to participant system 152 as a response to key retrieval request 306.

By way of example, as illustrated in FIG. 3A, node system 132 may receive key retrieval request 306, and an initiation module 216 may process key retrieval request 306 to detect a presence of contract identifier 212A, which uniquely identifies the distributed smart contract within the permissioned block-chain ledger. In some aspects, and in response to the detection of contract identifier 212A, initiation module 216 may perform operations that invoke the distributed smart contract and execute the code elements that establish the distributed smart contract, e.g., as maintained in notary module 150A of smart contract ledger blocks 150. In some instances, one or more processors of node system 132 may access the permissioned block-chain ledger (e.g., as maintained within ledger data 144 of data repository 142) and execute the code elements maintained within notary module 150A. In other instances, and consistent with the disclosed embodiments, node system 132 may execute an instance of a distributed virtual machine, which accesses the permissioned block-chain ledger and executes the code elements maintained within notary module 150A (e.g., based on output data generated by initiation module 216).

Upon invocation of the distributed smart contract, initiation module 216 may extract payload 307 from key retrieval request 306, and provide payload 307 as an input to notary module 150A, which includes the executable code elements that establish the distributed smart contract. For example, a verification module 218 of notary module 150A may receive payload 307, and perform any of the exemplary processes described above to verify participant system 152 is a participant in the permissioned block-chain network and possesses a requisite permission to access the distributed smart contract.

For example, if verification module 218 were to establish that participant system 152 is not a participant in the permissioned block-chain network, the distributed smart contract may decline to process key retrieval request 306 and return the requested public cryptographic key. In some aspects, notary module 150A may output data indicative of the unsuccessful verification, which node system 132 may relay back to participant system 152.

Alternatively, if participant data 220 were to include the system identifier of participant system 152, verification module 218 may verify that participant system 152 is a participant in the permissioned block-chain network, and may output confirmation data 310 indicative of the successful verification. In some instances, confirmation data 310 may also include system data 210 (e.g., which uniquely identifies participant system 152 within environment 100) and counterparty data 304 (e.g., which uniquely identifies participant system 172 within environment 100). Verification module 218 may provide confirmation data 310 as an input to a public key retrieval module 312, which may access one or more of public key blocks 148 of the permissioned block-chain ledger and extract the public cryptographic key maintained by the distributed smart contract on behalf of the counterparty system, e.g., participant system 172.

In some instances, public key retrieval module 312 may process confirmation data 310 to extract counterparty data 304, and may perform operations that identify a corresponding one of the ledger blocks within public key blocks 148 that includes counterparty data 304 and as such, maintains the public cryptographic key associated with the counterparty system, e.g., participant system 172. For example, public key retrieval module 312 may parse each ledger block of public key blocks 148 to identify ledger block 314, which includes counterparty data 304. Key retrieval module 312 may perform additional operations that extract a counterparty public key 316 from ledger block 314, and apply a digital signature 318 to counterparty public key 316 using a private cryptographic key of the distributed smart contract (not depicted in FIG. 3A). For example, and as described above, the application of digital signature 318 to counterparty public key 316 may verify the authenticity of both counterparty public cryptographic key 316 and the distributed smart contract, which immutably stored counterparty public cryptographic key 316 within the permissioned block-chain ledger.

Public key retrieval module 312 may also perform operations that generate public key data 320, which includes counterparty public key 316 and digital signature 318. Public key data 320 may, for example, represent an output of the distributed smart contract, in some aspects, notary module 150A may output public key data 320 to a response generation module 322 of node system 132. In some instances, response generation module 322 may perform operations that package portions of public key data 320, such as counterparty public key 316 and digital signature 318, into a response to key retrieval request 306, e.g., response 324. Node system 132 may then transmit response 324 across network 120 to participant system 152. By packaging both counterparty public key 316 and digital signature 318 into response 324, node system 132 may transmit counterparty public key 316 across network 120 without encryption (e.g., "in the clear"), as the inclusion of digital signature 318 enables participant system 152 may verify an integrity of counterparty public key 316 using the public cryptographic key of the distributed smart contract (e.g., maintained as contract identifier 212A within smart contract ledger blocks 150).

Figure 3B:
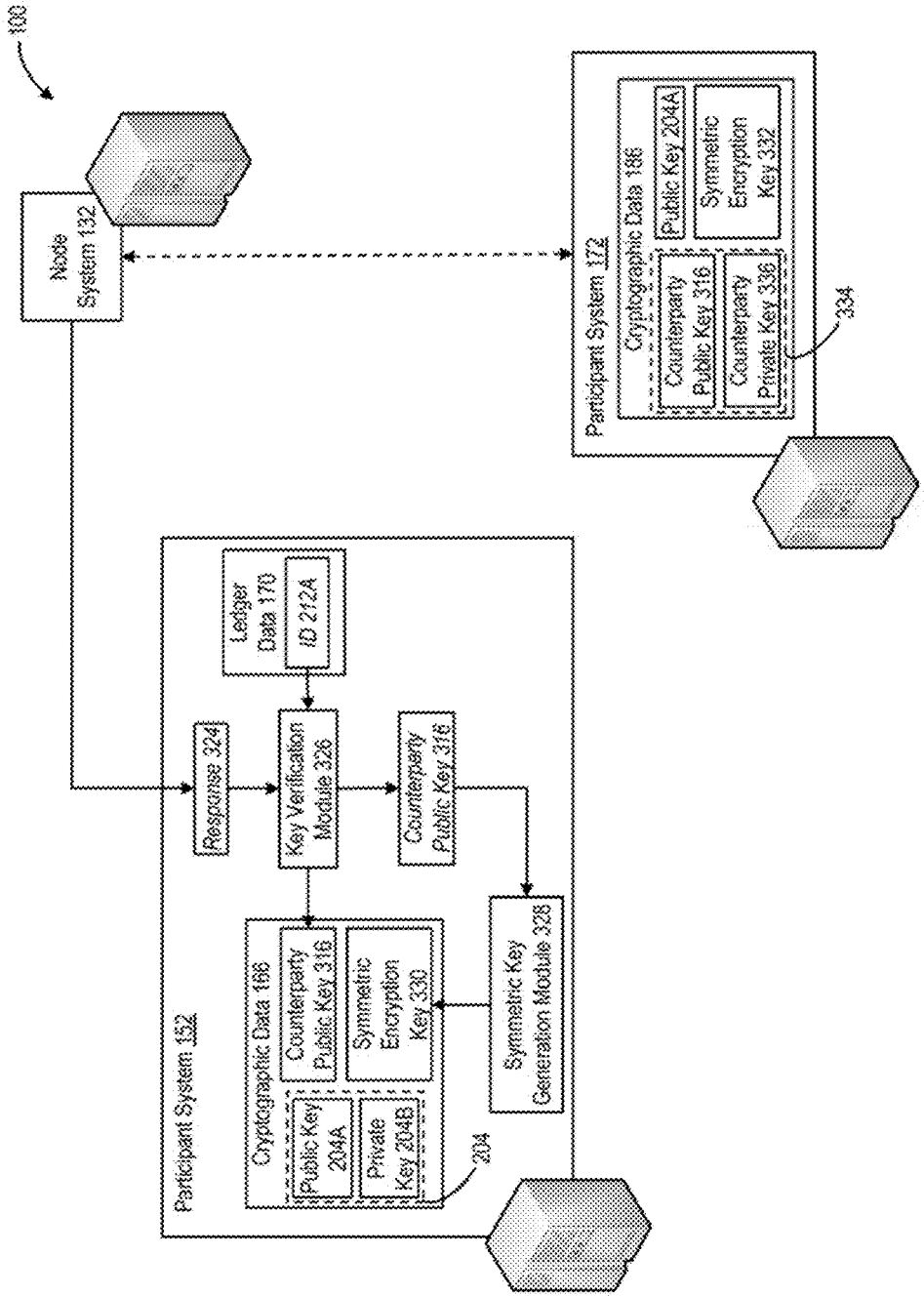

Referring to FIG. 3B, participant system 152 may receive response 324, and a key verification module 326 of participant system 152 may perform operations that verify an integrity of received response 324. For example, and as described herein, response 324 may include counterparty public key 316 and digital signature 318, which notary module 150A applied to counterparty public key 316 using the private cryptographic key of the distributed smart contract. In certain aspects, and to verify the integrity of counterparty public key 316, key verification module 326 may first compute a hash value of counterparty public key 316 (e.g., the computed hash value). Key verification module 326 may then obtain the public cryptographic key of the distributed smart contract from the one or more tangible, non-transitory memories (e.g., contract identifier 212A within ledger data 170 of data repository 162), and may decrypt digital signature 318 to obtain the corresponding hash value (e.g., as computed and encrypted by notary module 150A using any of the processes described above).

In some aspects, key verification module 326 may compare the computed and obtained hash value to verify the integrity of counterparty public key 316, as received from the one or more node systems, e.g., node system 132. For example, if the computed and obtained hash values fail to match, key verification module 326 may determine that the counterparty public key 316 was compromised during transmission from the one or more nodes to participant system 152. Key management module 326 may output an error signal, and perform operations that discard response 324, which includes the invalid and possibly compromised counterparty public key.

In other instances, if the computed and obtained hash values were to match, key verification module 326 may verify the integrity of counterparty public key 316, and may perform operations that store now-verified counterparty public key 316 within a portion of the one or more tangible, non-transitory memories, e.g., within cryptographic data 166 of data repository 162. Key verification module 326 may also provide counterparty public key 316 as an input to a symmetric key generation module 328, which may generate a symmetric encryption key 330 that facilitates the exchange of potentially sensitive data with the counterparty system, e.g., participant system 172. Symmetric key generation module 328 may, in certain aspects, generate symmetric encryption key 330 based on an application of one or more symmetric key generation algorithms to counterparty public key 316. Examples of these symmetric key generation algorithms include, but are not limited to, Diffie-Hellman algorithms, algorithms consistent with 3DES protocols, or algorithms consistent with 256-bit advanced encryption standard (AES) protocols.

Additionally, although not illustrated in FIGS. 3A and 3B, the counterparty system, e.g., participant system 172, may perform any of the processes described herein to: request, and obtain, a counterparty public cryptographic key associated with participant system 152 (e.g., public cryptographic key 204A); verify an integrity of the counterparty public cryptographic key based on a decryption of a digital signature applied key by notary module 150A of the distributed smart contract; and generate, based on the counterparty public cryptographic key, a symmetric encryption key (e.g., symmetric encryption key 332) that facilitates the exchange of potentially sensitive data with the participant system 152. In certain aspects, participant system 172 may perform operations that store the counterparty public cryptographic key, e.g., public cryptographic key 204A, and the generated symmetric encryption key, e.g., symmetric encryption key 332, within the one or more tangible, non-transitory memories, e.g., within cryptographic data 186 of data repository 182. Further, participant system 172 may also maintain, within cryptographic data 186, a cryptographic key pair 334 generated by participant system 172 using any of the processes described herein, which includes counterparty public key 316 and counterparty private key 332.

In some embodiments, the generation of symmetric encryption key 330 by participant system 152, and the generation of symmetric encryption key 332 by participant system 172, may collectively establish a secure channel of communications through which participant systems 152 and 172 can exchange potentially sensitive data across network 120. In some aspects, these exemplary computer-implemented processes, which facilitate a real-time, local generation of symmetric encryption keys, may be implemented in addition to or as an alternate to conventional key distribution processes, which centrally provision tamper-resistant, key management devices with local copies of the symmetric transport keys and manually distribute the provisioned key management devices to participant systems 152 and 172.

b. Computer-Implemented Processes for Establishing and Managing Occurrences of Lifecycle Events using Permissioned Distributed-Ledger Data Structures In certain embodiments, one or more network-connected systems operating within environment 100 may perform operations that establish and manage occurrences of discrete events within the lifecycle of a particular product, executable application, or element of digital content. For example, as described herein, participant systems 152 and 172 (and other computing devices within environment 100) may perform issuer, personalization, delivery, or decommissioning operations that, collectively or individually, establish and manage occurrences of discrete events within the issuance and operational lifecycle of an EMV-compatible payment card, and generate corresponding portions of event data that characterize each occurrence of the discrete events.

As described in greater detail below, participating systems 152 and 172 may perform additional operation that generate a cryptographically secure representation of each of the corresponding portions of the event data. Further, and in conjunction with one or more node systems operating within environment 100 (e.g., node system 132), participating systems 152 and 172 may perform operations that incorporate the cryptographically secure representations into one or more ledger blocks of a cryptographically secure, distributed-ledger data structure, such as the permissioned blockchain ledger described above, which maintains an immutable record of the event data characterizing the occurrences of each of the discrete events within the issuance and operational lifecycle of an EMV-compatible payment card.

In certain aspects, one or more of the discrete events within the issuance or operational lifecycle of the EMV-compatible payment card may correspond to an exchange of potentially sensitive data between network-connected systems operating within environment 100, such as participant systems 152 and 172. For example, as described herein, participant system 152 may perform operations that generate cryptographic data, such as an EMV-compatible issuer root key. In some aspects, participant system 152 may be configured to transmit portions of the generated cryptographic data across network 120 to participant system 172. Based on the received data, participant system 172 may perform personalization operations that, among other things, generate personalized card-specific cryptographic data based on the EMV-compatible issuer root key and that store, within the one or more tangible, non-transitory memories of the EMV-compatible payment card, portions of the personalized cryptographic data, along with account data and one or more EMV-compatible payment application received from participant system 152 or other participating systems operating within environment 100.

To facilitate the secure exchange of the sensitive data, participant systems 152 and 172 may perform any of the operations outlined herein to establish a secure communications session across network 120 based on locally generated symmetric encryption keys (e.g., as generated by participant systems 152 and 172 using corresponding counterparty public keys obtained through interaction with a distributed smart contract maintained within the permissioned block-chain ledger). In some aspects, described below, participant system 152 may generate a secure representation of the sensitive data based on, among other things, a selective encryption of the sensitive data using the locally generated symmetric encryption key.

Participant system 152 may also compute, and incorporate within the secure representation: (i) a first hash value based on the sensitive data (e.g., prior to encryption using the locally generated symmetric encryption key); (ii) a second hash value based on a concatenation of the selectively encrypted data (e.g., including encrypted and visible portions of the sensitive data) and the first hash value; and (ii) a digital signature applied to the selectively encrypted data and the first and second hash values. In some aspects, participant system may transmit the secure representation of the sensitive data across network 122 to participant system 172 using any of the communications protocols outlined above.

In some aspects, described below, participant system 172 may perform operations that validate the digital signature of the secure representation (e.g., using public cryptographic key 204A of participant system 152, as obtained through interaction with the distributed smart contract), and validate the second hash value included within the secure representation (e.g., by computing a complimentary hash value based on the selective encrypted data and the included first hash value). Finally, and as described below, participant system 172 may perform operations that, using the locally generated symmetric transport key, decrypt the selectively encrypted data and re-compute and validate the first hash value included within the within the secure representation.

In response to a successful validation of the digital signature, the first hash value, and the second hash value, participant system 172 may establish an integrity of the sensitive data provided by participant system 152. As described below, participant system 172 may perform operations that incorporate, within the received secure representation, an additional digital signature applied to the selectively encrypted data, the first and second hash values, and the digital signature applied by participant system 152. Further, in some aspects, participant system 172 may perform additional operations that, in conjunction with the one or more node systems operating in environment 100 (e.g., node system, 132), incorporate the secure representation of the sensitive data into one or more ledger blocks of a cryptographically secure, distributed-ledger data structure, such as the permissioned block-chain ledger described above. Through one or more of these exemplary processes, described in greater detail below in reference to FIGS. 4A-4E, the cryptographically secure, immutable structure of the permissioned block-chain ledger maintains the confidentiality of the sensitive portions of the data, while facilitating a tracking and a monitoring of not only the generation of the sensitive data by participant system 152, but also the secure exchange of that sensitive data between participant systems 152 and 172.

Referring to FIG. 4A, participant system 152 may maintain, within the one or more tangible, non-transitory memories, data characterizing occurrences of one or more discrete events within the lifecycle of the EMV-compatible payment card that were established or managed by participant system 152. For example, and as described herein, participant system 152 may generate issuer-specific cryptographic data, such as an issuer root key, which participant system 152 may maintain within a secure portion of the one or more tangible, non-transitory memories, such as within data 402 of lifecycle data 164, along with additional data characterizing the generation of the issuer root key, such as a time or date of generation. In some aspects, and to facilitate a progression of events within the lifecycle of the EMV-compatible payment card, participant system 152 may perform operations that generate a cryptographically secure representation of data 402, and transmit that cryptographically secure representation across network 120 to participant system 172 via a secure communications channel established through locally generated symmetric transport keys.

As illustrated in FIG. 4A. an initiation module 404 of participant system 152 may perform operations that access the one or more tangible, non-transitory memories and extract data 402 from data repository 162. For example, and as described above, data 402 may include the issuer root key generated by participant system 152 and the additional data that characterizes the generation of the issuer root key, such as the time or date of generation. Initiation module 404 may also access an additional portion of the one or more tangible, non-transitory memories (e.g., participant data 210), and extract system data 210, which uniquely identifies participant system 152 within environment 100. In some instances, system data 210 may include, but is not limited, an IP address or a MAC address of participant system 152.

Initiation module 404 may package extracted data 402 and system data 210 into a corresponding data package, e.g., event data 406. In some instances, a first portion of event data 406 represents sensitive data visible to and accessible by only certain network-connected systems that participate in the permissioned block-chain network, while a second portion of event data 406 represents data visible to and accessible by any of the participant systems (and additionally or alternatively, any other network-connected systems operating within environment 100). For example, within event data 406, the EMV-compatible issuer root key may represent sensitive data, while the unique identifier of participant system 152 (e.g., system data 210) and the time or date at which participant system generated the EMV-compatible issuer root key may represent insensitive data visible to any participating system within the permissioned block-chain network.

In some examples, initiation module 404 may provide event data 406 as an input to a hash generation module 408, which applies an appropriate hash algorithm to the concatenated, unencrypted contents of event data 406 (e.g., data 402 and system data 210) to generate a first hash value, e.g., event content hash value 410. A management module 416 of participant system 152 may receive event content hash value 410, and perform operations that store event content hash value 410 within a corresponding portion of the one or more tangible, non-transitory memories, such as local message data 171.

Initiation module 404 may also provide event data 406 as an input to a symmetric encryption module 412, which selectively encrypts the sensitive portions of event data 406 using a locally generated symmetric encryption key, e.g., symmetric encryption key 330. For example, symmetric encryption module 412 may process event data 406 to identify the first portion that represents sensitive data (e.g., the issuer root key, etc.) and the second portion that represents insensitive data visible to any participating system within the permissioned block-chain network (e.g., the unique identifier of participant system 152, the time or date at which participant system generated the issuer root key, etc.). Symmetric encryption module 412 may also perform operations that retrieve symmetric encryption key 330 from a portion of the one or more tangible, non-transitory memories, such as cryptographic data 166.

In certain aspects, symmetric encryption module 412 may encrypt the sensitive first portion of event data 406 (e.g., that represents sensitive data) using symmetric encryption key 330, may generate and output protected event data 414. For example, protected event data 414 may include encrypted data 414A, which maintains the confidentiality of the sensitive first portion of event data 406 (e.g., the issuer root key, etc.), and visible data 414B, which corresponds to the insensitive second portion of event data 406 (e.g., the unique identifier of participant system 152, the time or date at which participant system generated the issuer root key, etc.). Management module 416 may receive protected event data 414, and perform operations that store protected event data 414 within a corresponding portion of the one or more tangible, non-transitory memories, such as local message data 171.

As described above, symmetric encryption module 412 may perform operations that selectively encrypt and maintain the confidentiality of the sensitive portions of event data 406, while maintaining a visibility of the insensitive portions of event data 406 to network-connected systems operating within environment 100. In other aspects, and consistent with the disclosed embodiments, symmetric encryption module 412 may be configured to encrypt both the sensitive and insensitive portions of event data 406 using symmetric encryption key 330, and output protected event data that includes only encrypted content. The encryption of both the sensitive and insensitive portions of the event data 406 may, in some instances, heighten a level of security associated with an exchange of potions of the protected event data between participant system 152, participant system 172, and other network-connected systems operating within environment 100.

Further, the disclosed embodiments are not limited to these examples of sensitive data (e.g., the issuer root key) or insensitive data (e.g., the unique identifier of participant system 152, the time or date at which participant system generated the issuer root key). In additional instances, symmetric encryption module 412 may perform operations that establish any additional or alternate portion of event data 406 as sensitive data, and that establish any additional or alternate portion of event data 406 as insensitive data. For example, symmetric encryption module 412 may establish that a public cryptographic key of participant system 152, participant system 172, or other network-connected systems participating in the permissioned block-chain network represents insensitive data, while the corresponding private cryptographic key represents sensitive data suitable for selective encryption using any of the processes described above.

Figure 4B:
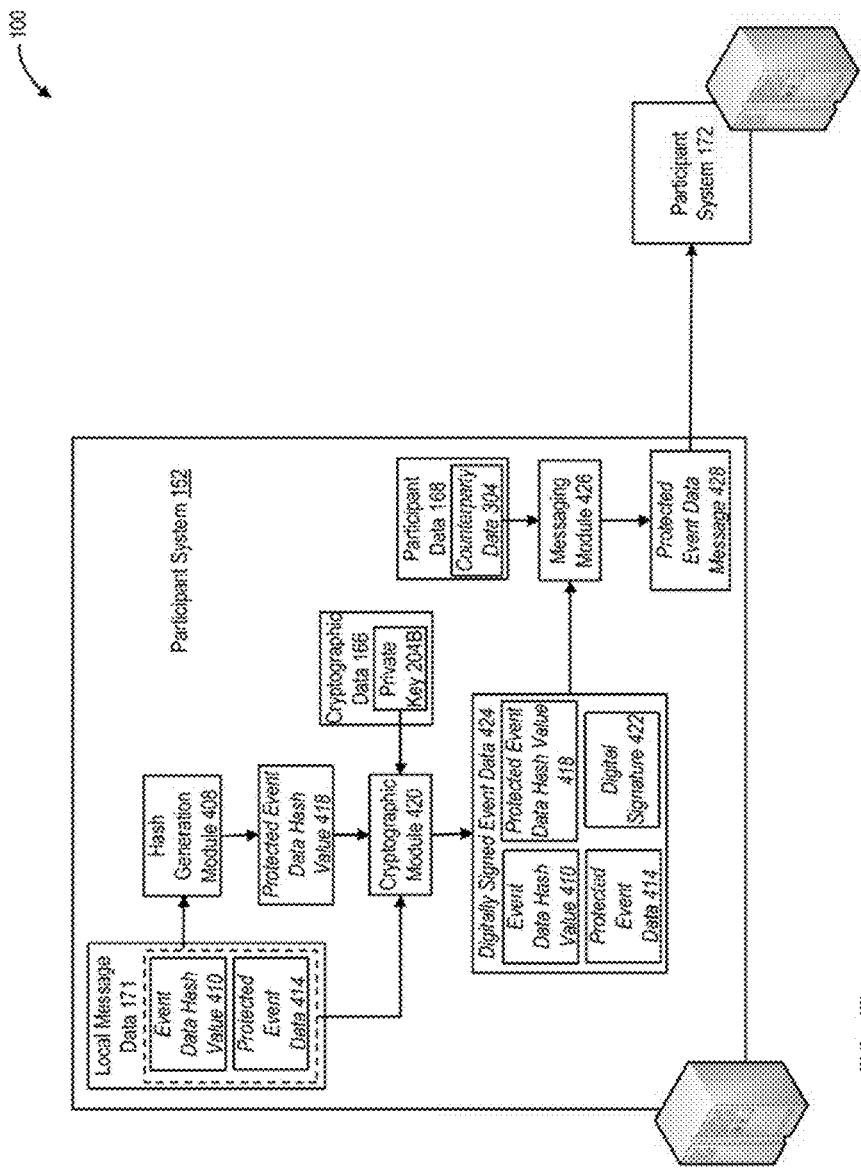

Referring to FIG. 4B, hash generation module 408 may perform operations that obtain event data hash value 410 and protected event data 414 from a portion of the one or more tangible, non-transitory memories, e.g., from local message data 171. In some aspects, hash generation module 408 may apply an appropriate hash algorithm to the concatenated contents of event data hash value 410 and protected event data 414 to generate a second hash value, e.g., protected event data hash value 418. Hash generation module 408 may output and protected event data hash value 418 as an input to a cryptographic module 420 of participant system 152, Cryptographic module 420 may receive protected event data hash value 418, and further, may perform operations that obtain event data hash value 410 and protected event data 414 from a portion of the one or more tangible, non-transitory memories, e.g., from local message data 171. In some aspects, cryptographic module 420 may perform operations that generate a digital signature 422 based on private cryptographic key 204B of participant system 152 (e.g., as maintained within cryptographic data 166) and applied to event data hash value 410, protected event data 414, and protected event data hash value 418. For example, cryptographic module 420 may apply an appropriate hash algorithm to a concatenation of event data hash value 410, protected event data 414, and protected event data hash value 418 to generate a corresponding hash value, which cryptographic module 420 may encrypt using private cryptographic key 204B to generate and apply digital signature 422.

In some examples, cryptographic module 420 may also establish digitally signed event data 424, which includes, but is not limited to, event data hash value 410, protected event data 414, protected event data hash value 418, and digital signature 422, and output digitally signed event data 424 to a messaging module 426, which performs operations that package digitally signed event data 424 for transmission to participant system 172. For example, message module 426 may obtain, from the one or more tangible, non-transitory memories, data that uniquely identifies participant system 172 (e.g., counterparty data 304 within participant data 168), and incorporates portions of counterparty data 304 into protected digitally signed event data 424 to generate and output a protected event data message 428. The incorporated portions of counterparty data 304 may include, but are not limited to, an IP address or a MAC address of participant system 172, and participant system 152 may transmit protected event data message 428 across network 120 to participant system 172, e.g., as identified by a corresponding identifier included within counterparty data 304.

In certain aspects, described herein, digitally signed event data 424 may represent a cryptographically secure representation of event data 406. As described below in reference to FIGS. 4C and 4D, participant system 172 may perform operations that verify an integrity of the cryptographically secure representation, and in response to a successful verification, incorporate the cryptographically secure representation of the event data 406 (and thus, the discrete event established and managed by participant systems 152 and 172) into one or more ledger blocks of a cryptographically secure, distributed-ledger data structure, such as the permissioned block-chain ledger described above. In some instances, described herein, the permissioned block-chain ledger maintains an immutable record of the event data characterizing the occurrences of each of the discrete events within the issuance and operational lifecycle of an EMV-compatible payment card.

Figure 4C:
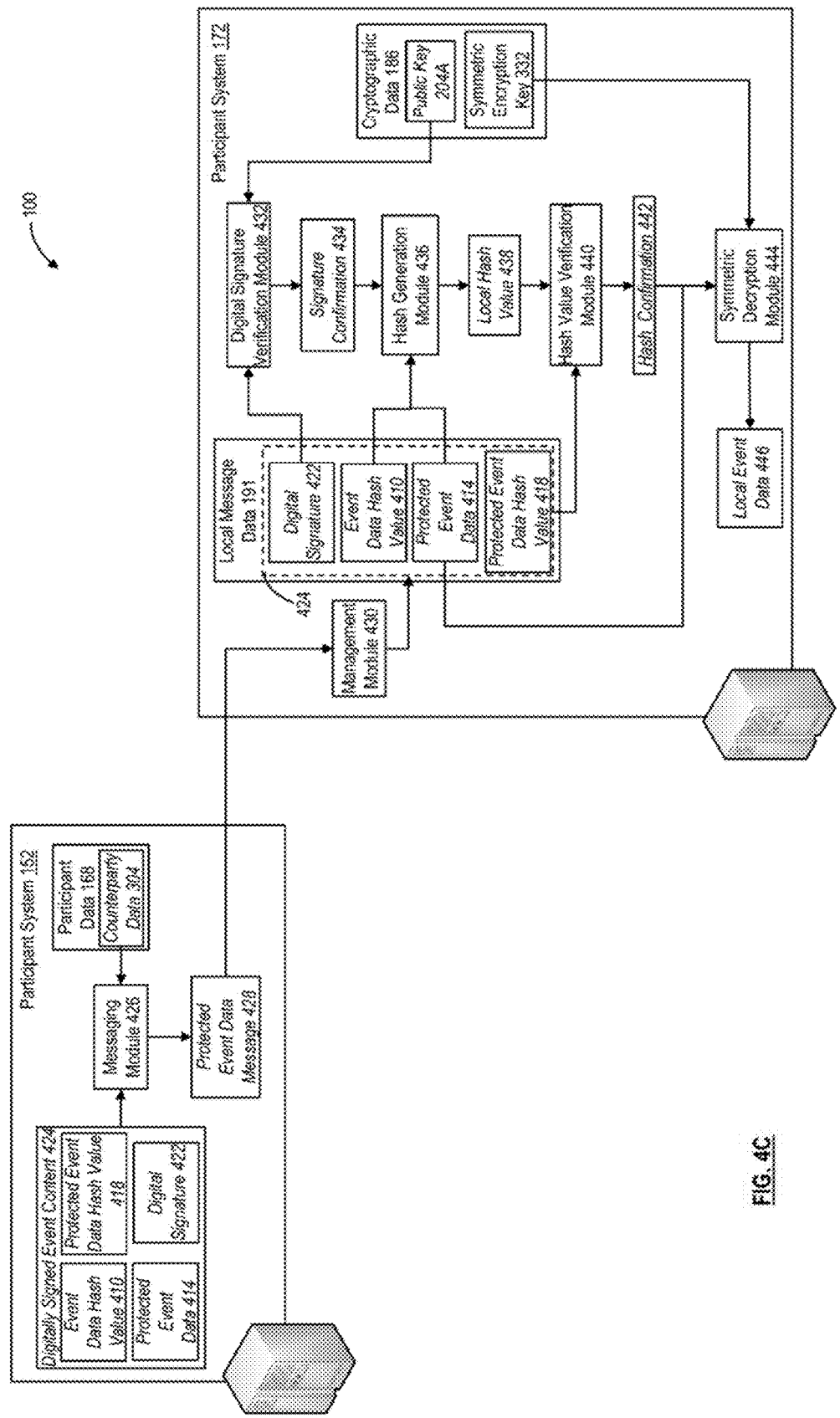

Referring to FIG. 4C, a management module 430 of participant system 172 may receive protected event data message 428, and may process protected event data message 428 to extract digitally signed event data 424 for storage within the one or more tangible, non-transitory memories, such as local message data 191. For example, management module 430 may perform operations that, among other things, unpack protected digitally signed event data 424 and store each of event data hash value 410, protected event data 414, protected event data hash value 418, and digital signature 422 within local message data 191.

In some aspects, and as an initial step to verify an integrity of digitally signed event data 424 (e.g., the cryptographically secure representation of event data 406), a digital signature verification module 432 may access digital signature 422, e.g., as maintained within local message data 191, and perform operations that verify accessed digital signature 422 using the public cryptographic key of participant system 152, e.g., public cryptographic key 204A maintained within cryptographic data 186. Participant system 172 may, in some instances, perform any of the processes described herein to obtain public cryptographic key 204A of participant system 152 through secure exchanges of data with the distributed smart contract maintained within the permissioned, block-chain ledger.

By way of example, digital signature verification module 432 may decrypt digital signature 422 using public cryptographic key 204A, extract the hash value from now-decrypted digital signature 422, and perform operations that compute a local copy of the hash value of event data hash value 410, protected event data 414, protected event data hash value 418, and digital signature 422 using any appropriate hash algorithm. Digital signature verification module 432 may perform additional operations that compare the extracted and locally computed versions of the hash values, and based on an outcome of the comparison, verify now-decrypted digital signature 422.

For instance, if digital signature verification module 432 were to detect an inconsistency between the extracted and locally computed hash values, at least a portion of event data hash value 410, protected event data 414, or protected event data hash value 418 may have been modified, intentionally or unintentionally, subsequent to the application of digital signature 422 by participant system 152. Digital signature verification module 432 may decline to verify digital signature 422, and may generate an error signal, which may cause participant system 172 to generate and transmit an error message across network 120 to participant system 152 in response to protected event data message 428.

In other instances, if digital signature verification module 432 were to establish a consistency the received and locally hash values, digital signature verification module 432 may verify the digital signature and confirm that event data hash value 410, protected event data 414, or protected event data hash value 418 were not modified subsequent to the application of digital signature 422 by participant system 152. Based on the established consistency, digital signature verification module 432 may generate signature confirmation data 434 that confirms the verification of digital signature 422, and participant system 172 may perform additional operations that verify the integrity of portions of protected event data message 428 based on each of the hash values included within protected event data message 428, e.g., event data hash value 410, and protected event data hash value 418.

By way of example, a hash generation module 436 of participant system 172 may receive signature confirmation data 434, and may perform operations that compute a local copy of protected event data hash value 418, e.g., local hash value 438. In some instances, hash generation module 436 may obtain event data hash value 410 and protected event data 414 from local message data 191 (e.g., as maintained within the one or more tangible, non-transitory memories), and apply an appropriate hash algorithm to a concatenation of event data hash value 410 and protected event data 414 to generate local hash value 438.

In certain aspects, a hash verification module 440 of participant system 172 may receive local hash value 438, e.g., as computed by hash generation module 436, and may perform operations that obtain protected event data hash value 418 from local message data 191 (e.g., as maintained within the one or more tangible, non-transitory memories). Based on a comparison of local hash value 438 and protected event data hash value 418, hash verification module 440 may verify an integrity of event data hash value 410 and protected event data 414.

For example, if hash verification module 440 were to detect an inconsistency between local hash value 438 and protected-event-data hash value 418, at least a portion of event-data hash value 410 or protected event data 414 may have been modified, intentionally or unintentionally, subsequent to the calculation of protected-event-data hash value 418 by participant system 152 (and prior to the application of digital signature 422). In response to the detected inconsistency, hash verification module 440 may generate an error signal, which may cause participant system 172 to generate and transmit an error message across network 120 to participant system 152 in response to protected event data message 428.

Alternatively, if hash verification module 440 were to establish a consistency between local hash value 438 and protected-event-data hash value 418, hash verification module 440 may confirm that event-data hash value 410 and protected event data 414 were not modified subsequent to the calculation of protected-event-data hash value 418 by participant system 152. Based on the established consistency, hash verification module 440 may generate hash confirmation data 442 that confirms the verification of protected-event-data hash value 418, and participant system 172 may perform additional operations that verify an integrity of the underlying event data included within protected event data message 428.

Hash verification module 440 may provide hash confirmation data 442 as an input to a symmetric decryption module 444 of participant system 152. In some aspects, symmetric decryption module 444 may obtain protected event data 414 from local message data 191 (e.g., as maintained within the one or more tangible, non-transitory memories), and may perform operations that decrypt the selectively encrypted portions of protected event data 414 using a locally generate copy of a symmetric encryption key (e.g., symmetric encryption key 332) to generate a local copy 446 of event data 406. For example, and using any of the processes described herein, participant system 172 may generate local symmetric encryption key 332 based on the local copy of the public cryptographic key of participant system 152 (e.g., public cryptographic key 204A) obtained through secure interaction with the distributed smart contract maintained in the permissioned block-chain ledger, and participant system 172 may maintain locally generated symmetric encryption key 332 within a portion of the one or more tangible, non-transitory memories (e.g., within cryptographic data 186).

Figure 4D:
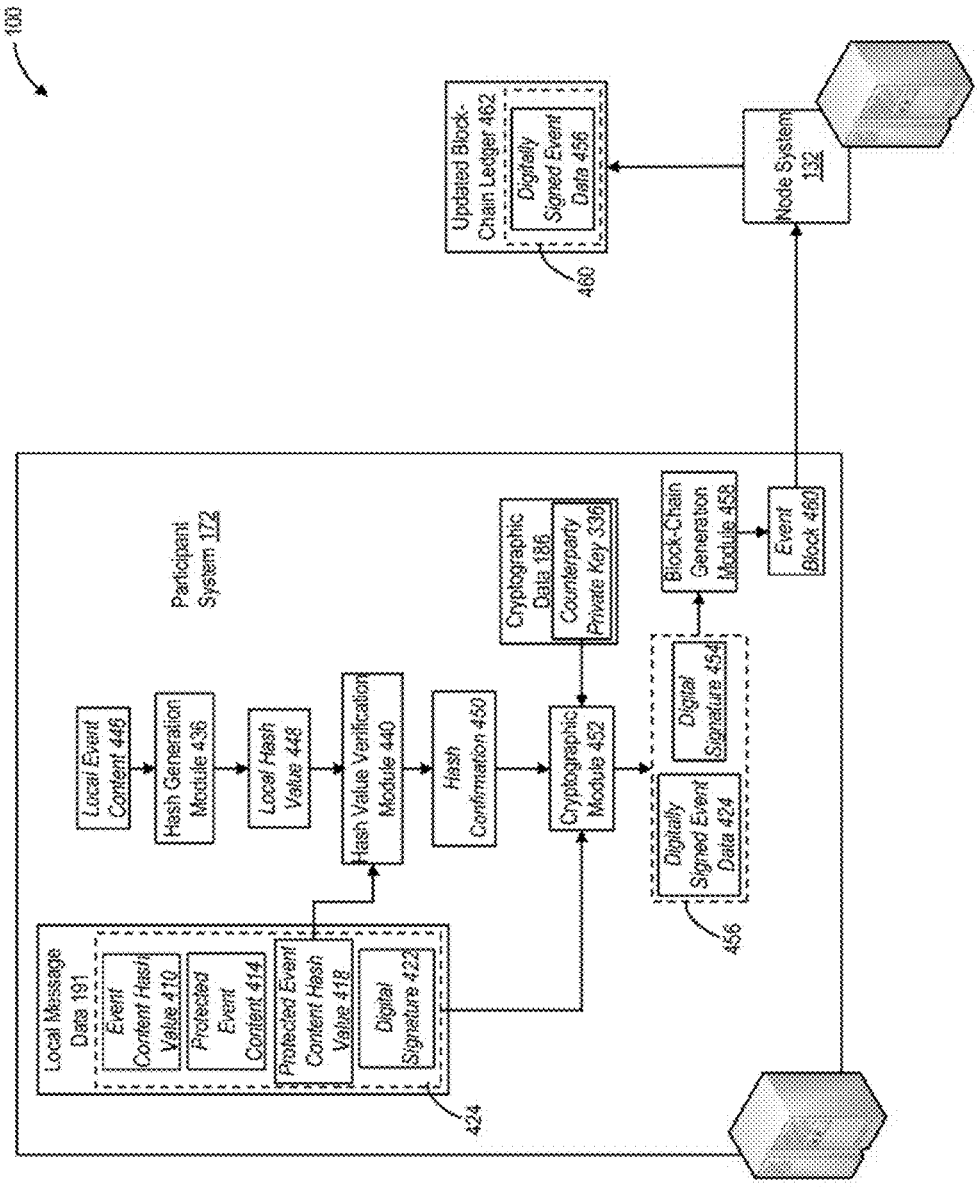

Referring to FIG. 4D, symmetric decryption module 444 may provide local copy 446 of event data 406 as an input to hash generation module 436, which applies an appropriate hash algorithm to a concatenation of the contents of local copy 446 to compute a local hash value 448. In certain aspects, hash verification module 440 may receive local hash value 448, and may perform operations that obtain event data hash value 410 from local message data 191 (e.g., as maintained within the one or more tangible, non-transitory memories). Based on a comparison of local hash value 448 and event data hash value 410, hash verification module 440 may verify an integrity of protected event data 414 and as such, of underlying event data 406.

For example, if hash verification module 440 were to detect an inconsistency between local hash value 448 and event data hash value 410, at least a portion of protected event data 414 may have been modified, intentionally or unintentionally, prior to the calculation of protected event-data hash value 418 by participant system 152. In response to the detected inconsistency, hash verification module 440 may generate an error signal, which may cause participant system 172 to generate and transmit an error message across network 120 to participant system 152 in response to protected event data message 428.

Alternatively, if hash verification module 440 were to establish a consistency between local hash value 448 and event-data hash value 410, hash verification module 440 may verify an integrity of protected event data 414 (e.g., that no portion of protected event data 414 or underlying event data 406 was modified subsequent to its generation by participant system 152). Based on the established consistency, hash verification module 440 may generate hash confirmation data 450 that confirms the verification of protected event data 414. Participant system 172 may apply an additional digital signature to digitally signed event data 424, and in conjunction with the one or more node systems operating in environment 100 (e.g., node system, 132), perform additional operations that incorporate digitally signed event data 424 into one or more ledger blocks of a cryptographically secure, distributed-ledger data structure, such as the permissioned block-chain ledger described above.

For example, a cryptographic module 452 of participant system 172 may receive hash confirmation data 450, and may perform operations that obtain portions of digitally signed event data 424, such as event-data hash value 410, protected event data 414, protected-event-data hash value 418, and digital signature 422, from the one or more tangible, non-transitory memories, e.g., from local message data 171. Using any of the processes described above, cryptographic module 420 may perform operations that generate a digital signature 454 based on a private cryptographic key of participant system 172 (e.g., counterparty private key 336 maintained within cryptographic data 186) and applied to digitally signed event data 424. In some aspects, and through the generation and application of digital signature 454, participant system 172 may confirm a receipt of digitally signed event data 424 from participant system 152 and an integrity of protected event data 414 (and underlying event data 406) included within digitally signed event data 424.

Cryptographic module 420 may also establish digitally signed event data 456, which includes, but is not limited to, digitally signed event data 424 (e.g., event data hash value 410, protected event data 414, protected event data hash value 418, and digital signature 422) and newly generated and applied digital signature 454. In certain aspects, not depicted in FIG. 4D, participant system 172 may perform operations that store all or a portion of digitally signed event data 456 within the one or more tangible, non-transitory memories, e.g., within a secure portion of lifecycle data 164.

Further, in additional aspects, a block-chain generation module 458 of participant system 172 receives digitally signed event data 456, and may perform operations that generate event block data 460 that includes digitally signed event data 456. Participant system 172 may broadcast event block data 460 to one or more node systems, such as node system 132, capable of processing event block data 460 for inclusion in a latest, longest version of the cryptographically secure, distributed-ledger data structure, e.g., the permissioned block-chain ledger described above.

Node system 132 (and any additional or alternate node systems operating within environment 100) may perform any of the operations described herein to competitively compute a proof-of-work or a proof-of-stake associated with one or more new ledger blocks that include event block data 460, and in response to the competitively computed proofs-of-work or -stake, append the one or more new ledger blocks (e.g., that include event block data 460) to the permissioned, block-chain ledger to generate an updated version of the permissioned block-chain ledger, e.g., updated permissioned block-chain ledger 462. In some instances, not illustrated in FIG. 4D, node system 132 may distribute updated permissioned block-chain ledger 462 to the other node systems operating within environment 100 and further, to each network-connected system that participants in the permissioned block-chain network, such as participant systems 152 and 172.

Figure 4E:
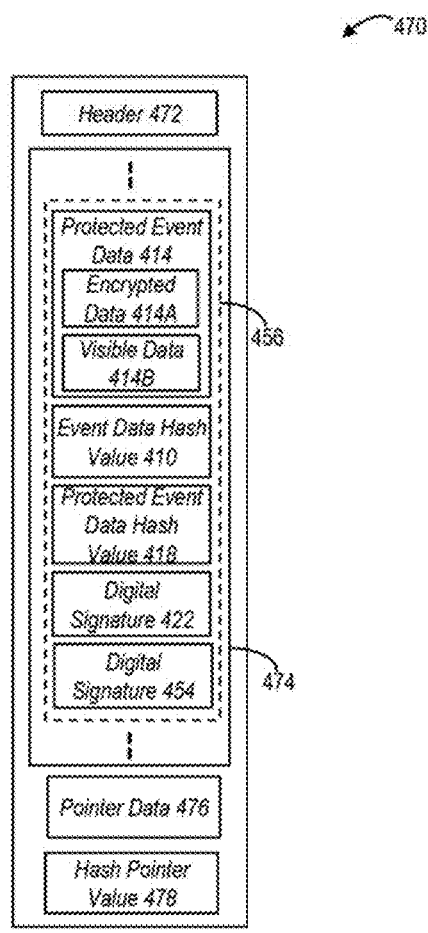
FIG. 4E illustrates an exemplary distributed ledger data structure, in accordance with the disclosed embodiments.

For example, as illustrated in FIG. 4E, the one or more ledger blocks that include event block data 460, e.g., ledger block 470, may include header data 472, a body portion 474, pointer data 476, and a hash pointer value 478. For example, header data 472 may include, but is not limited to, data specifying a proof-of-work or -scope computed by the one or more node systems (such as a difficulty, a time stamp, or a nonce), data characterizing a structure of updated permissioned block-chain ledger 462 (such as a merkle tree root), or a sequential counter identifying a position of ledger block 470 within updated permissioned block-chain ledger 462.

As illustrated in FIG. 4E, body portion 474 may include digitally signed event data 456, which characterizes the establishment and management of a discrete event within the lifecycle of the EMV-compatible payment card, such as the generation of the issuer root key by participation system 152 and the cryptographically secure transmission of the issuer root key (and other data) to participant system 172. Additionally, although not depicted in FIG. 4E, body portion 474 may also include data characterizing other discrete events within the lifecycle of the EMV-compatible payment card that are established or managed by participant systems 152 or 172, or by other network-connected systems that participate in the lifecycle of the EMV-compatible payment card.

As described above, digitally signed event data 456 may include event data hash value 410, protected event data 414, protected event data hash value 418, digital signature 422, and digital signature 454. In some aspects, as described above, protected event data 414 may include encrypted data 414A (e.g., the issuer root key encrypted using locally generated symmetric transport key 330) and visible data 414B (e.g., a unique identifier of participant system 152, the time or date at which participant system generated the issuer root key, etc.). Further, although not illustrated in FIG. 4E, protected event data 414 may also include data that uniquely identifies the EMV-compatible payment card, such a public cryptographic key, that facilitates a real-time tracking of a position of the EMV-compatible payment card within its issuance or operational lifecycle, e.g., based on operations performed by one or more network-connected systems participating in the permissioned block-chain network or by a distributed smart contract maintained within one or more ledger blocks of the permissioned block-chain ledger, as described below.

As described below, digital signature 422 may be applied to event data hash value 410, protected event data 414, protected event data hash value 418 by participant system 152 prior to transmission to participant system 172 (e.g., within protected event data message 428). Further, participant system 172 may apply digital signature 454 to event data hash value 410, protected event data 414, protected event data hash value 418, digital signature 422 to verify the integrity of each component of protected event data message 428 and to confirm a successful completion of the transfer of protected event data 414 from participant system 152 to participant system 172.

Referring back to FIG. 4E, pointer data 476 may identify a position of an immediately prior ledger block within updated permissioned block-chain ledger 462 (e.g., a counter value associated with the immediately prior ledger block). Further, in some instances, hash pointer value 476 may include a hash value generated through an application of an appropriate hash algorithm to the concatenated contents of that immediately prior ledger block (e.g., as indicated by the prior block pointer). The disclosed embodiments are, however, not limited to these examples of ledger-block data, and in other aspects, ledger block 470 may include any additional or alternate data that would be appropriate to and would characterize the discrete events within the issuance and operational lifecycle of the EMV-compatible payment card, and further, would be capable of being established, managed, or monitored by participant system 152, participant system 172, and other network-connected systems that participate in the lifecycle of the EMV-compatible payment card and the permissioned block-chain network, as described above.

As described herein, one or more network-connected systems operating within environment 100 perform issuer, personalization, delivery, or decommissioning operations that, collectively or individually, establish and manage occurrences of discrete events within the issuance and operational lifecycle of an EMV-compatible payment card, and generate corresponding portions of event data that characterize each occurrence of the discrete events. In certain aspects, one or more of the discrete events may correspond to, or be facilitated by, an exchange of potentially sensitive data between network-connected systems operating within environment 100, such as participant systems 152 and 172.

In other aspects, one or more of the discrete events may be established or managed not based on collaborative operations performed by multiple network-connected systems in communication across a corresponding network, but instead based on operations performed by a single network-connected participant system. For example, participant system 152 (or alternatively, participant system 172) may perform personalization algorithms that generate, for the EMV-compatible payment card, one or more RSA-based public-private cryptographic key pairs for provisioning to the one or more tangible, non-transitory memories of the EMV-compatible payment card. The generation of these RSA-based cryptographic keys may, in some instances, correspond to a discrete event within the lifecycle of the EMV-compatible payment card and participant system 152 (or participant system 172) may generate event data characterizing the generation of the RSA-based cryptographic keys.

The generated event data may, in some aspects, include the generated RSA-based cryptographic keys, along with additional data characterizing a time or date of generation. As described above, however, the generated event data may include sensitive potions visible to and accessible by only a subset of the network-connected systems that participate in the lifecycle of the EMV-compatible payment card (e.g., the generated private cryptographic keys) and insensitive portions visible to and accessible by any network-connected system that participate in the lifecycle of the EMV-compatible payment card (e.g., the generated public cryptographic keys, the time or date of generation, etc.).

Figure 5A:
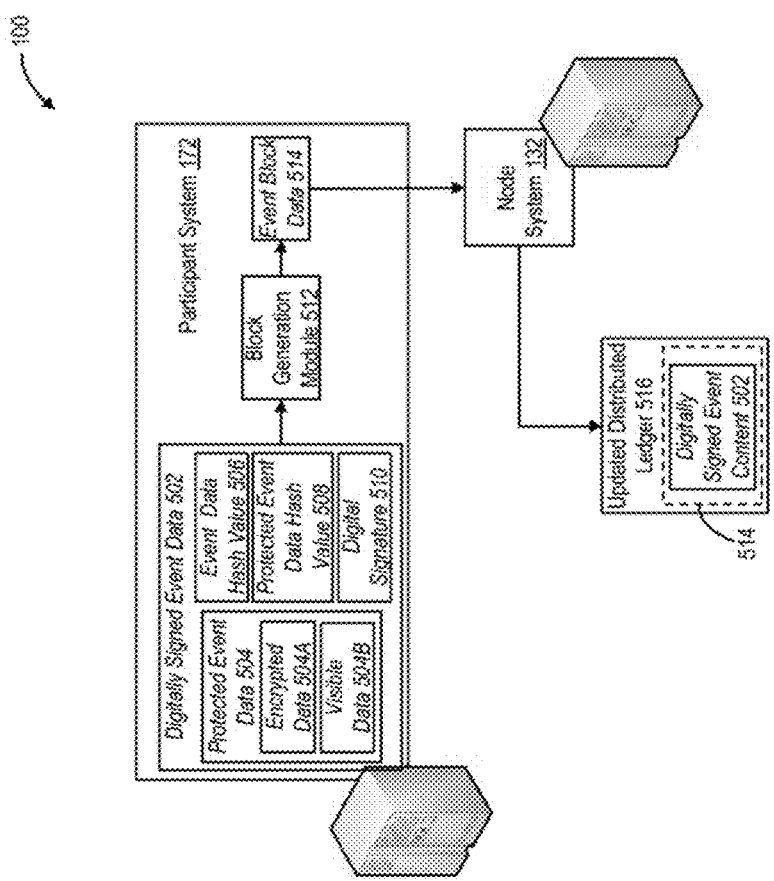
FIG. 5A illustrates a portion of an exemplary computing environment, in accordance with the disclosed embodiments.
Figure 5B:
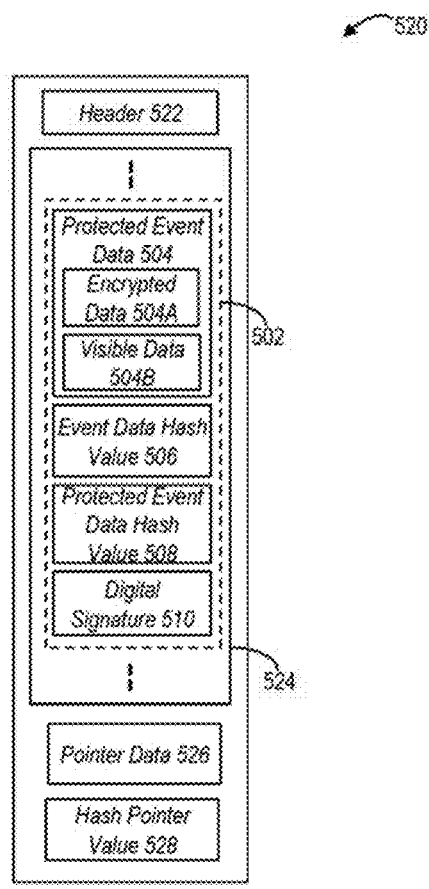
FIG. 5B illustrates an exemplary distributed ledger data structure, in accordance with the disclosed embodiments.

In certain aspects, described in reference to FIGS. 5A and 5B, participant system 152 (or participant system 172) may perform any of the processes described herein to selectively encrypt the sensitive portions of the generated event data (e.g., to generate protected event data), and to incorporate the selectively encrypted portions of the event data into one or more ledger blocks of a cryptographically secure, distributed-ledger data structure, which maintains a confidentiality of the sensitive portions of the generated event data, while facilitating a real-time tracking and monitoring of the discrete events within the lifecycle of the EMV-compatible payment card.

Referring to FIG. 5A, participant system 152 may perform any of the processes described herein to obtain, from the one or more tangible, non-transitory memories (e.g., from lifecycle data 164 of FIG. 1), data characterizing an occurrence of a discrete event within the lifecycle of the EMV-compatible payment card that is established or managed by participant system 152. As described above, the discrete event may correspond to generation of one or more RSA-based public and private cryptographic key pairs for the EMV-compatible payment card, and the obtained event data may include elements of sensitive data (e.g., the one or more private cryptographic keys) and elements of insensitive data (e.g., the one or more public cryptographic keys, the date of time of generation, etc.).

In some aspects, and using any of the processes described above, participant system 152 may apply an appropriate hash algorithm to the concatenated contents of the obtained event data to generate a first hash value, e.g., event data hash value 506, and may store event data hash value 506 within the one or more tangible, non-transitory memories. Participant system 152 may also perform any of the processes described above to identify a first portion of the obtained event data that represents sensitive data (e.g., the one or more private cryptographic keys, etc.) and a second portion of the obtained event data that represents insensitive data visible to any participating system within the permissioned block-chain network (e.g., the one or more public cryptographic keys, the date of time of generation, etc.). Further, and using any of the processes described above, participant system 152 may selectively encrypt the identified first portion of the obtained event data (e.g., that represents sensitive data) to generate and output protected event data, e.g., protected event data 504.

In some aspects, participant system 152 may selectively encrypt the identified first portion of the obtained event data using a symmetric encryption key generated through an application of an appropriate key generation algorithm to a public cryptographic key of participant system 152, e.g., public cryptographic key 204A. Examples of these symmetric key generation algorithms include, but are not limited to, Diffie-Hellman algorithms, algorithms consistent with 3DES protocols, or algorithms consistent with 256-bit advanced encryption standard (AES) protocols. In other aspects, participant system 152 may selectively encrypt the identified first portion of the obtained event data using other symmetric encryption keys, or using any additional or alternate appropriate encryption key, such as public cryptographic key 204B.

Referring back to FIG. 5A, protected event data 504 may include encrypted data 504A, which maintains the confidentiality of the sensitive first portion of the obtained event data (e.g., the one or more private cryptographic keys, etc.), and visible data 504B, which corresponds to the insensitive second portion of the obtained event data (e.g., the one or more public cryptographic keys, the date of time of generation, etc.). In further aspects, and using any of the processes described above, participant system 152 may apply an appropriate hash algorithm to the concatenated contents of event data hash value 506 and protected event data 504 to generate a second hash value, e.g., protected event data hash value 508. Participant system 152 may also perform any of the processes described above to generate a digital signature 510 based on private cryptographic key 204B of participant system 152 (e.g., as maintained within cryptographic data 166) and applied to event data hash value 506, protected event data 504, and protected event data hash value 508.

In some examples, and using any of the processes described above, participant system 152 may also establish digitally signed event data 502, which includes, but is not limited to, event data hash value 506, protected event data 504, protected event data hash value 508, and digital signature 510. In certain aspects, described herein, digitally signed event data 504 may represent a cryptographically secure representation of the obtained event data, which characterizes the generation of the one or more RSA-based cryptographic public-private key pairs within the lifecycle of the EMV-compatible payment card.

Referring to FIG. 5A, a block-chain generation module 512 of participant system 152 receives digitally signed event data 502, and may perform any of the operations described above to generate event block data 514. In some examples, event block data 514 may include digitally signed event data 502, which participant system 152 may broadcast to one or more node systems, such as node system 132, capable of processing event block data 514 for inclusion in a latest, longest version of the cryptographically secure, distributed-ledger data structure, e.g., the permissioned block-chain ledger described above.

Node system 132 (and any additional or alternate node systems operating within environment 100) may perform any of the operations described herein to competitively compute a proof-of-work or a proof-of-stake associated with one or more new ledger blocks that include event block data 514, and in response to the competitively computed proofs-of-work or -stake, append the one or more new ledger blocks (e.g., that include event block data 514) to the permissioned, block-chain ledger to generate an updated version of the permissioned block-chain ledger, e.g., updated permissioned block-chain ledger 516. In some instances, not illustrated in FIG. 5A, node system 132 may distribute updated permissioned block-chain ledger 516 to the other node systems operating within environment 100 and further, to each network-connected system that participants in the permissioned block-chain network, such as participant systems 152 and 172.

For example, as illustrated in FIG. 5B, the one or more ledger blocks that include event block data 514, e.g., ledger block 520, may include header data 522, a body portion 524, pointer data 526, and a hash pointer value 528. For example, header data 522 may include, but is not limited to, data specifying a proof-of-work or -scope computed by the one or more node systems (such as a difficulty, a time stamp, or a nonce), data characterizing a structure of updated permissioned block-chain ledger 516 (such as a merkle tree root), or a sequential counter identifying a position of ledger block 520 within updated permissioned block-chain ledger 516.

As illustrated in FIG. 5B, body portion 524 may include digitally signed event data 502, which characterizes the establishment and management of the discrete event within the lifecycle of the EMV-compatible payment card by participant system 152, such as the generation of the one or more RSA-based public-private cryptographic keys for the EMV-compatible payment card. Additionally, although not depicted in FIG. 5B, body portion 524 may also include data characterizing other discrete events within the lifecycle of the EMV-compatible payment card that are established or managed by participant systems 152 or 172, or by other network-connected systems that participate in the lifecycle of the EMV-compatible payment card.

As described above, digitally signed event data 502 may include protected event data 504, event data hash value 506, protected event data hash value 508, and digital signature 510. As described herein, digital signature 510 may be applied to protected event data 504, event data hash value 506, and protected event data hash value 508 by participant system 152 in confirmation of a successful completion of the discrete lifecycle event, e.g., the generation of the one or more RSA-based public and private cryptographic key pairs.

In some aspects, as described above, protected event data 504 may include encrypted data 504A, which maintains the confidentiality of the sensitive first portion of the obtained event data (e.g., the one or more private cryptographic keys, etc.), and visible data 504B, which corresponds to the insensitive second portion of the obtained event data (e.g., the one or more public cryptographic keys, the date of time of generation, etc.). Further, although not illustrated in FIG. 5B, protected event data 504 may also include data that uniquely identifies the EMV-compatible payment card, such a public cryptographic key, that facilitates a real-time tracking of a position of the EMV-compatible payment card within its issuance or operational lifecycle, e.g., based on operations performed by one or more network-connected systems participating in the permissioned block-chain network or by a distributed smart contract maintained within one or more ledger blocks of the permissioned block-chain ledger, as described below.

Referring back to FIG. 5B, pointer data 526 may identify a position of an immediately prior ledger block within updated permissioned block-chain ledger 516 (e.g., a counter value associated with the immediately prior ledger block). Further, in some instances, hash pointer value 528 may include a hash value generated through an application of an appropriate hash algorithm to the concatenated contents of that immediately prior ledger block (e.g., as indicated by the prior block pointer). The disclosed embodiments are, however, not limited to these examples of ledger-block data, and in other aspects, ledger block 520 may include any additional or alternate data that would be appropriate to and would characterize the discrete events within the issuance and operational lifecycle of the EMV-compatible payment card.

As described herein, a network-connected system operating within environment 100, such as participant system 152, performs operations that establish and manage occurrences of discrete events within the lifecycle of an EMV-compatible payment card without an exchange of potentially sensitive data between network-connected systems operating within environment 100. Further, although described in reference to operations performed by participant system 152, the exemplary event-established and event-management processes described above (e.g., in reference to FIG. 5A) may be performed by any additional or alternate network-connected system that participates in the lifecycle of the EMV-compatible payment card, such as participant system 172. Further, the disclosed embodiments are not limited to the examples of the discrete events described above, and in other aspects, the discrete events may include any additional or alternate event within the lifecycle of the EMV-compatible payment card that is capable of being established or managed by a single one of the network-connected devices operating within environment 100, such as participant systems 152 or 172.

Figure 6A:
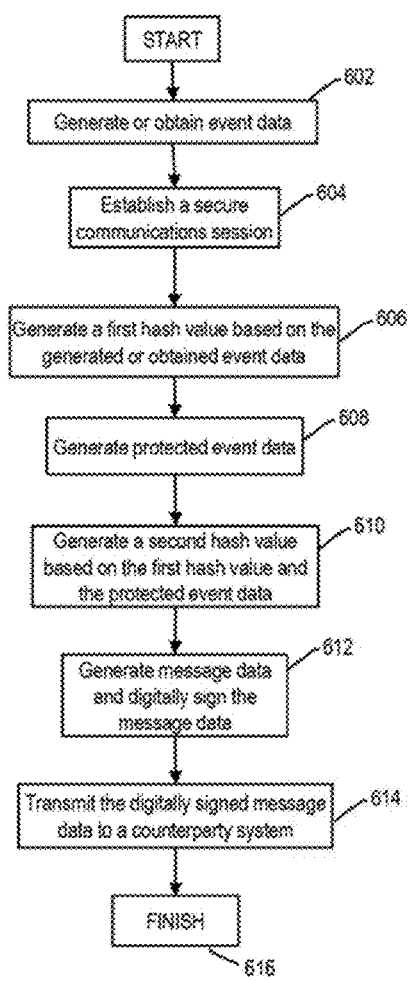
FIGS. 6A-6C are flowcharts of example processes for managing a cryptographically secure generation and exchange of data using a permissioned distributed ledger, in accordance with the disclosed embodiments.
Figure 6B:
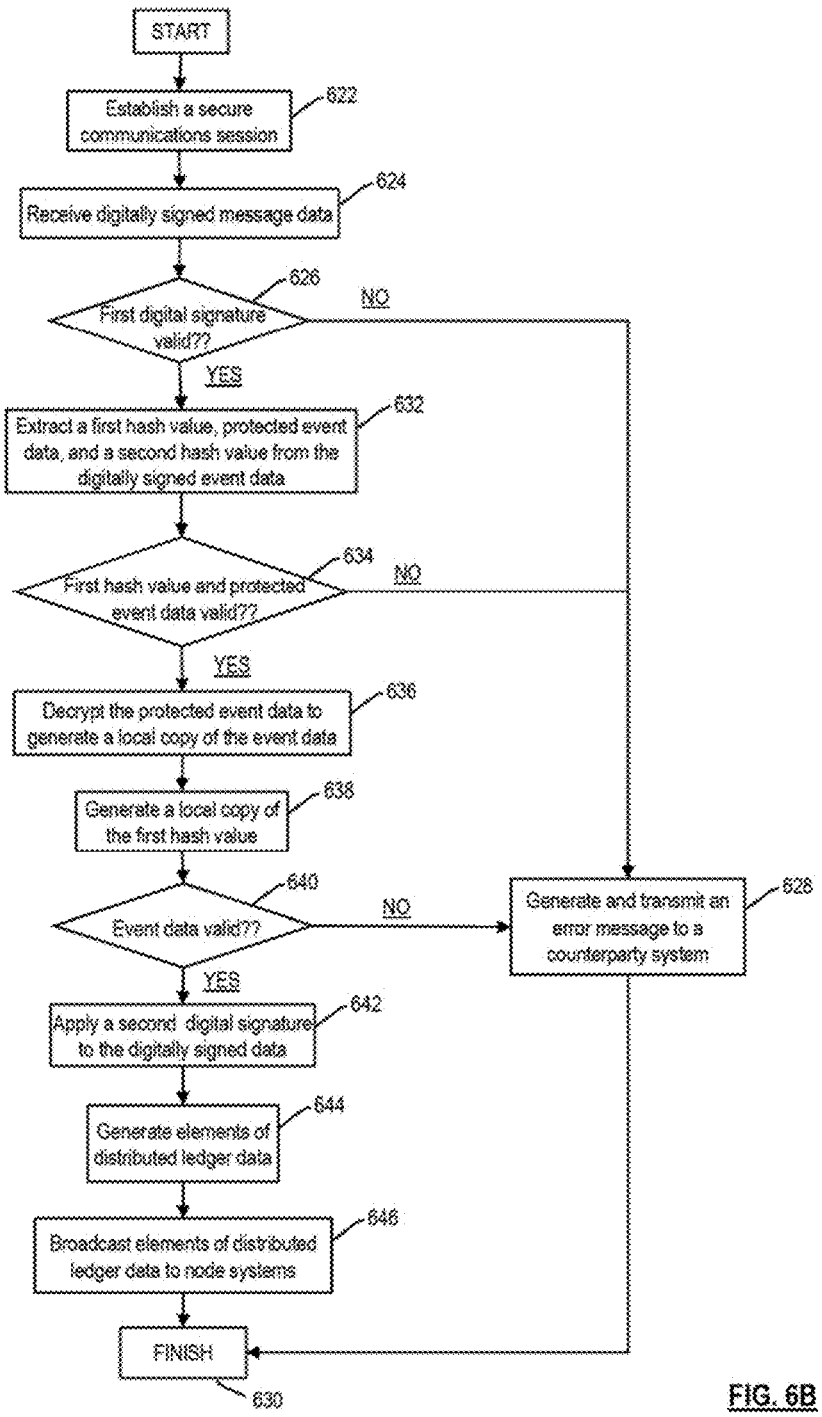
Figure 6C:
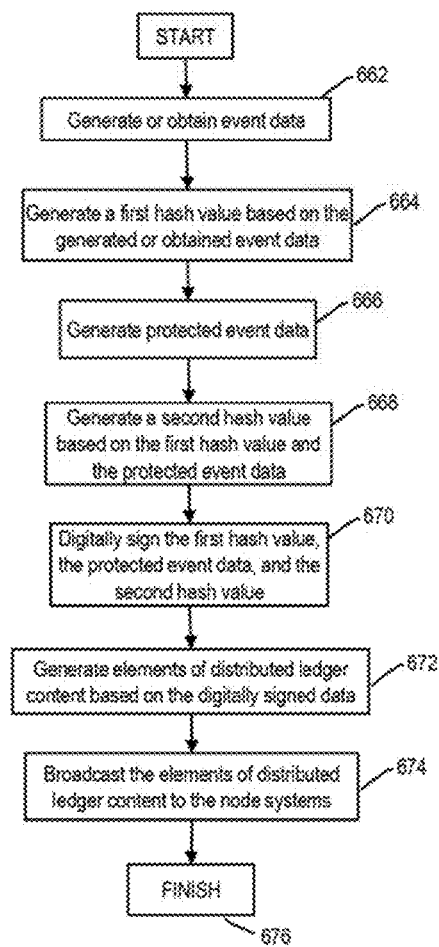

FIGS. 6A, 6B, and 6C are flowcharts of example processes for establishing and managing occurrences of events based on cryptographically secure distributed ledger data, in accordance with the disclosed embodiments. In some aspects, and as described above, the establish and managed discrete events may include, but are not limited to, discrete events within an issuance or an operations lifecycle of an EMV-compatible payment card. Further, one or more network-connected systems may participate in the issuance or operational lifecycle of the EMV-compatible payment card, and perform operations that establish and manage one or more of the discrete events within the issuance or operational lifecycle.

By way of example, one or more of the discrete events may be established and managed based on collaborative operations performed by multiple network-connected systems in communications across a corresponding network, such as participant systems 152 and 172 connected across network 120 of FIG. 1. As described below in reference to FIG. 6A, participant system 152 (or participant system 172) may perform certain steps of exemplary process 600 to generate or obtain event data characterizing at least a portion of a discrete, collaboratively established and managed event, to establish a secure channel of communications with a counterparty system (e.g., a corresponding one of participant systems 172 or 152) across network 120, and to generate, and transmit to the counterparty system across the secure communications channel, a cryptographically secure representation of the generated or obtained event data.

Referring to FIG. 6A, participant system 152 may perform any of the processes described above to generate or obtain data characterizing an occurrence of a discrete event, such as a discrete event within the issuance or operational lifecycle of the EMV-compatible payment card (e.g., in step 602). As described above, the discrete event may be established and managed by participant system 152 in conjunction with additional operations performed by a network-connected counterparty system, such as participant system 172.

In some examples, and as described above, a first portion of the generated or obtained event data may include sensitive data visible to or accessible by a permissioned set of network-connected devices, such as participant systems 152 or 172. Examples of sensitive data include, but are not limited to, an issuer root key, account data associated with the EMV-compatible payment card (e.g., an account number, an expiration date, a CVV or CSC, an PIN number, etc.), and one or more personalized private cryptographic keys generated on behalf of the EMV-compatible payment card. In other examples, a second portion of the generated or obtained event data may include insensitive data visible to and accessible to any network-connected system or device operating within a computing environment, e.g., environment 100, that includes participant systems 152 and 172. Examples of insensitive data include, but are not limited to, publicly available network identifiers (e.g., IP addresses or MAC addresses), timestamp data, and one or more personalized public cryptographic keys generated on behalf of the EMV-compatible payment card.

In certain aspects, both participant system 152 and the network-connected counterparty system, e.g., participant system 172, may also access a cryptographically secure, distributed-ledger computing structure, such as a permissioned block-chain ledger. The permissioned block-chain ledger may include one or more ledger blocks that, among other things, maintain an immutable and secure record characterizing the establishment and management of the discrete events by participant system 152, participant system 172, and other network-connected systems that participate in the lifecycle of the EMV-compatible payment card. As described above, participant systems 152 and 172, in conjunction with one or more node systems operating within environment 100, such as node system 132, may establish a permissioned block-chain network of connected systems having capable of accessing and operating upon the permissioned block-chain ledger (and whose network identities, such as IP addresses, are mutually available and known to each member of the permissioned, block-chain network).

Referring back to FIG. 6A, participant system 152 may perform any of the exemplary processes described above to establish a secure communications session with participant system 172 across network 120 (e.g., in step 604). For example, and as described above, participant system 172 may perform operations to obtain, through secure interaction with the one or more node systems (e.g., node system 132) that administer a distributed smart contract maintained within one or more ledger blocks of the permissioned block-chain ledger, a public cryptographic key associated with participant system 172 (e.g., counterparty public key 316) and cryptographic data that verifies an integrity of the public cryptographic key (e.g., a digital signature generated using a private cryptographic key associated with the distributed smart contract). Further, using any of the processes described above, participant system 152 may apply an appropriate symmetric key generation algorithm to generate locally a symmetric encryption key capable of encrypting data exchanged across the secure communications channel. Examples of these symmetric key generation algorithms include, but are not limited to, Diffie-Hellman algorithms, algorithms consistent with 3DES protocols, or algorithms consistent with 256-bit advanced encryption standard (AES) protocols.

Participant system 152 may also perform any of the processes described above to apply an appropriate hash algorithm to the concatenated contents of the generated or obtained event data, which generates a first hash value (e.g., in step 606). Additionally, in some instances, participant system 152 may selectively encrypt the sensitive first portion of the generated or obtained event data using the locally generated symmetric encryption key to generate protected event data (e.g., in step 608).

For example, in step 608, participant system 152 may perform any of the processes described above to identify, within the generated or obtained event data, the first portion that represents sensitive data and the second portion that represents insensitive data visible to any participating system within the permissioned block-chain network, and to selectively encrypt the identified first portion of the generated or obtained event data using the locally generated symmetric encryption key. In certain aspects, the protected event data (e.g., as generated and output in step 608) maintains the confidentiality of the sensitive data, while maintaining a visibility of the insensitive data to network-connected systems operating within environment 100. Further, in additional aspects, participant system 152 may apply an appropriate hash algorithm to a concatenation of the first hash value (e.g., which represents the generated or obtained event data prior to encryption) and the protected event data, which generates a second hash value (e.g., in step 610).

In certain aspects, the first hash value, the protected event data, and the second hash value may collectively establish message data for exchange with the network-connected counterparty system (e.g., participant system 172), and participant system 152 may perform any of the processes described above to generate a first digital signature based on a private cryptographic key of participant system 152 (e.g., private cryptographic key 204B of FIG. 2) and apply the first digital signature to the concatenated contents of the message data (e.g., in step 612). Participant system 152 may perform additional operations, as described above, to transmit the message data and the applied first digital signature across network 120 to the network-connected counterparty system, such as participant system 172 (e.g., in step 614). Exemplary process 600 is then complete in step 616.

The message data and the applied first digital signature may collectively represent a cryptographically secure representation of the event data generated or obtained by participant system 152. As described below in reference to FIG. 6B, participant system 172 (or participant system 152) may perform certain steps of exemplary process 620 to verify an integrity of the cryptographically secure representation, and in response to a successful verification, incorporate the cryptographically secure representation of the generated or obtained event data (and thus, the discrete events established and managed by participant systems 152 and 172) into one or more ledger blocks of a cryptographically secure, distributed-ledger data structure, such as the permissioned block-chain ledger described above. In some instances, described herein, the permissioned block-chain ledger maintains an immutable record of the event data characterizing the occurrences of each of the discrete events within the issuance and operational lifecycle of an EMV-compatible payment card.

Referring to FIG. 6B, participant system 172 may perform any of the exemplary processes described above to establish a secure communications session with participant system 152 across network 120 (e.g., in step 622). For example, and as described above, participant system 172 may perform operations to obtain, through secure interaction with the one or more node systems (e.g., node system 132) that administer a distributed smart contract maintained within one or more ledger blocks of the permissioned block-chain ledger, a public cryptographic key associated with participant system 152 and cryptographic data that verifies an integrity of the public cryptographic key (e.g., a first digital signature generated using a private cryptographic key associated with the distributed smart contract). Further, using any of the processes described above, participant system 152 may apply an appropriate symmetric key generation algorithm to generate locally a symmetric encryption key capable of encrypting data exchanged across the secure communications channel. Examples of these symmetric key generation algorithms include, but are not limited to, Diffie-Hellman algorithms, algorithms consistent with 3DES protocols, or algorithms consistent with 256-bit advanced encryption standard (AES) protocols.

In some aspects, participant system 172 may receive the message data and the applied first digital signature from participant system 152 across network 120 via the secure communications session (e.g., in step 624). As described above, the message data may include, but is not limited to, the first hash value, the protected event data, and the second hash value (e.g., as generated by participant system 152), and the first digital signature may be generated and applied to the message data by participant system 152 using the corresponding private key (e.g., private cryptographic key 204B).

In certain aspects, the received message data may correspond to a cryptographically secure representation of the event data generated or obtained by participant system 152. As an initial step to verify an integrity of the received message data (e.g., the cryptographically secure representation), participant system 172 may perform any of the operations described above to validate the applied first digital signature using the public cryptographic key of participant system 152, e.g., public cryptographic key 204A (e.g., in step 626). As described above, participant system 172 may obtain public cryptographic key 204A of participant system 152 through secure exchanges of data with the distributed smart contract maintained within the permissioned, block-chain ledger.

By way of example, in step 626, participant system 172 may decrypt the applied digital signature using public cryptographic key 204A, extract the message hash value from the now-decrypted digital signature, and perform operations that compute a local copy of the message hash value based on an application of any appropriate hash algorithm to the received message data. Participant system 172 may perform additional operations, in step 626, that compare the received and locally computed versions of the message hash value, and based on an outcome of the comparison, validate the now-decrypted first digital signature.

If participant system 172 were to detect an inconsistency between the received and locally computed versions of the message hash value (e.g., step 626; NO), at least a portion of the received message data may have been modified, intentionally or unintentionally, subsequent to the application of the first digital signature by participant system 152. In response to the detected inconsistency, participant system 172 may decline to verify the applied first digital signature, and may generate and transmit an error message across network 120 to participant system 152 (e.g., in step 628). Exemplary process 620 may then be complete in step 630.

Alternatively, if participant system 172 were to establish a consistency the received and locally computed versions of the message hash value (e.g., in step 626; YES), participant system 172 may validate the applied first digital signature and confirm that received message data was not modified subsequent to the application of the digital signature by participant system 152. Based on the established consistency, participant system 172 may process the received message data to extract first hash value, the protected event data, and the second hash value (e.g., in step 632), and perform operations that verify an integrity of the first hash value and the protected event data (e.g., included within the received message data) based on the extracted second hash value (e.g., in step 634).

As described above, participant system 152 may initially compute the second hash value based on an application of an appropriate hash algorithm to a concatenation of the first hash value and the protected event data. In some instances, in step 634, participant system 172 may extract copies of the first hash value and the protected event data from the received message data, and apply the appropriate hash algorithm to a concatenation of the extracted first hash value and protected event data to generate the local copy of the second hash value. Based on a comparison of the extracted and locally generated copies of the second hash value, participant system 172 may verify the integrity of the extracted first hash value and the protected event data in step 634.

For example, if participant system 172 were to detect an inconsistency between extracted and locally computed copies of the second hash value (e.g., step 634; NO), at least a portion of the extracted first hash value or protected event data may have been modified, intentionally or unintentionally, subsequent to the calculation of the first hash value by participant system 152 (and prior to the application of the digital signature). In some aspects, exemplary process 620 may pass back to step 628, and participant system 172 may generate and transmit an error message across network 120 to participant system 152. Exemplary process 620 may then be complete in step 630.

Alternatively, if participant system 172 were to establish a consistency between the extracted and locally generated copies of the second hash value (e.g., step 634; YES), participant system 172 may verify an integrity of extracted the first hash value and the protected event data, and confirm that neither the first hash value nor the protected event data were modified subsequent to the calculation of the second hash value by participant system 152. Based on the established consistency, participant system 172 may perform additional operations that verify an integrity of the underlying event data included within protected event data (e.g., in steps 636, 638, and 640, described below).

For example, participant system 172 may perform operations that decrypt the selectively encrypted portions of the protected event data using a locally generated copy of the symmetric encryption key (e.g., symmetric encryption key 332), which generates a local copy of the underlying event data (e.g., in step 636). Participant system 172 may further apply one or more hash generation algorithms to the local copy of the underlying event data to generate a local copy of the first hash value (e.g., in step 638). Further, and based on a comparison between the extracted and locally generated copies of the first hash value, participant system 172 may verify an integrity of the underlying event data (e.g., in step 640).

For example, if participant system 172 were to detect an inconsistency between the extracted and locally computed values of the first hash value (e.g., step 642; NO), at least a portion of the underlying event data may have been modified, intentionally or unintentionally, prior to the calculation of the first hash value by participant system 152. In response to the detected inconsistency, participant system 172 may decline to verify the integrity of the underlying event data. In some aspects, exemplary process 620 may pass back to step 628, and participant system 172 may generate and transmit an error message across network 120 to participant system 152. Exemplary process 620 may then be complete in step 630.

Alternatively, if participant system 172 were to establish a consistency between the extracted and locally computed copies of the first hash value (e.g., step 640; YES), participant system 172 may verify the integrity of the underlying event data, and confirm that no portion of the event data was modified subsequent to being generated or obtained by participant system 152. Based on the established consistency, participant system 172 may perform any of the processes described above to generate a second digital signature based on its private cryptographic key (e.g., counterparty private key 336 of FIG. 3B), and apply the second digital signature to the received and now-verified message data and to the first digital signature applied by participant system 152 (e.g., in step 642). In some aspects, the application of the second digital signature to the received message data and to the previously applied first digital signature may confirm the verification of each constituent component of the received message data and the first digital signature.

Further, in additional aspects, participant system 172 may perform operations that generate elements of distributed ledger data, e.g., ledger block data, that include the received message data, the applied first digital signature, and the second digital signature (e.g., in step 644), and that broadcast the generated ledger block data to one or more node systems, such as node system 132, operating within the computing environment that includes participant systems 152 and 172 (e.g., in step 646). In certain aspects, the generated ledger block data may reflect the verification of the received message data and the applied first digital signature by participant system 172, e.g., as confirmed by the applied second digital signature. In some aspects, the application of the second digital signature to the received message data and to the previously applied first digital signature may confirm the verification of each constituent component of the received message data and the first digital signature. Exemplary process 620 is then complete is step 630.

The one or more mode systems may perform any of the operations described above to incorporate the generated ledger block data into one or more ledger blocks of an updated permissioned block-chain ledger, such as updated permissioned block-chain ledger 462 of FIG. 4D, which may be distributed among the one or more node systems and to other network-connected systems that participate within the permissioned, block-chain network. In some aspects, described herein, the cryptographically secure, immutable structure of the permissioned block-chain ledger may, in some instances, maintain a confidentiality of sensitive portions of event data, while facilitating a tracking and a monitoring of not only the generation of the event data by participant systems 152 or 172, but also the secure exchange of that cryptographic data between participant systems 152 and 172.

In other aspects, one or more of the discrete events may be established or managed not based on collaborative operations performed by multiple network-connected systems in communication across a corresponding network, but instead based on operations performed by a single network-connected participant system. For example, participant system 152 (or alternatively, participant system 172) may perform personalization algorithms that generate, for the EMV-compatible payment card, one or more RSA-based public-private cryptographic key pairs for provisioning to the one or more tangible, non-transitory memories of the EMV-compatible payment card. The generation of these RSA-based cryptographic keys may, in some instances, correspond to a discrete event within the lifecycle of the EMV-compatible payment card and participant system 152 (or participant system 172) may generate event data characterizing the generation of the RSA-based cryptographic keys.

In certain aspects, described below in reference to FIG. 6C, participant system 152 (or participant system 172) may perform certain steps of exemplary process 660 to generate or obtain event data characterizing at least a portion of a discrete event established or manage by participant system 152 (or participant system 172), to generate a cryptographically secure representation of the generated or obtained event data, and to incorporate the cryptographically secure representation of the event data into one or more ledger blocks of a cryptographically secure, distributed-ledger data structure (e.g., the permissioned block-chain ledger described above), which maintains a confidentiality of the sensitive portions of the generated or obtained event data, while facilitating a real-time tracking and monitoring of the discrete events within the lifecycle of the EMV-compatible payment card.

Referring to FIG. 6C, participant system 152 may perform any of the processes described herein to generate or obtain data characterizing an occurrence of a discrete event within the lifecycle of the EMV-compatible payment card that is established or managed by participant system 152 (e.g., in step 662). For example, the occurrence of the discrete event may correspond to generation of one or more RSA-based public and private cryptographic key pairs for the EMV-compatible payment card, and the generated or obtained event data may include elements of sensitive data (e.g., the one or more private cryptographic keys) and elements of insensitive data (e.g., the one or more public cryptographic keys, the date of time of generation, etc.). Further, and using any of the processes described above, participant system 152 may apply an appropriate hash algorithm to the concatenated contents of the obtained event data to generate a first hash value (e.g., in step 664).

Additionally, in some instances, participant system 152 may selectively encrypt the sensitive first portion of the generated or obtained event data using the locally generated symmetric encryption key to generate protected event data (e.g., in step 666). For example, in step 666, participant system 152 may perform any of the processes described above to identify a first portion of the generated or obtained event data that represents sensitive data (e.g., the one or more private cryptographic keys, etc.) and a second portion of the generated or obtained event data that represents insensitive data visible to any participating system within the permissioned block-chain network (e.g., the one or more public cryptographic keys, the date of time of generation, etc.).

Further, in step 666, participant system 152 may also selectively encrypt the identified first portion of the obtained event data using a symmetric encryption key generated through an application of an appropriate key generation algorithm to a public cryptographic key of participant system 152, e.g., public cryptographic key 204A. Examples of these symmetric key generation algorithms include, but are not limited to, Diffie-Hellman algorithms, algorithms consistent with 3DES protocols, or algorithms consistent with 256-bit advanced encryption standard (AES) protocols. In other aspects, participant system 152 may selectively encrypt the identified first portion of the obtained event data using other symmetric encryption keys, or using any additional or alternate appropriate encryption key, such as public cryptographic key 204B.

Participant system 152 may also apply an appropriate hash algorithm to a concatenation of the first hash value and the protected event data 504 to generate a second hash value (e.g., in step 668). Additionally, in step 670, participant system 152 may perform any of the processes described above to generate and apply a digital signature based to the first hash value, the protected event data, and the second hash value using a private cryptographic key of participant system 152 (e.g., private cryptographic key 204B of FIG. 2). In some aspects, the application of the digital signature to the first hash value, the protected event data, and the second hash value may confirm the occurrence of the discrete event established or managed by participant system 152. Further, the first hash value, the protected event data, the second data hash value, and the applied digital signature may collectively establish a cryptographically secure representation of the event data generated or obtained by participant system 152.

Further, in additional aspects, participant system 152 may perform operations that generate elements of distributed ledger data, e.g., ledger block data, that includes the first hash value, the protected event data, the second data hash value, and the applied digital signature (e.g., in step 672), and that broadcast the generated ledger block data to one or more node systems, such as node system 132, operating within the computing environment that includes participant systems 152 and 172 (e.g., in step 674). Exemplary process 660 is then complete in step 676.

In certain aspects, the generated ledger block data may confirm the occurrence of the discrete event established or managed by participant system 152, and the one or more mode systems may perform any of the operations described above to incorporate the generated ledger block data into one or more ledger blocks of an updated permissioned block-chain ledger, such as updated block-chain ledger 462 of FIG. 4D. As described above, the updated permissioned block-chain ledger may be distributed among the one or more node systems and to other network-connected systems that participate within the permissioned, block-chain network. In some aspects, described herein, the cryptographically secure, immutable structure of the permissioned block-chain ledger may, in some instances, maintain a confidentiality of sensitive portions of the event data, while facilitating a tracking and a monitoring of the generation or the obtaining of the event data by participant systems 152 or 172.

c. Computer-Implemented Processes for Tracking a Status of Lifecycle Events using Permissioned Distributed-Ledger Data Structures In certain embodiments, as describe herein, one or more network-connected systems operating within environment 100 may perform operations that establish and manage occurrences of discrete events within the lifecycle of a particular product, executable application, or element of digital content. For example, as described herein, participant systems 152 and 172 (and other computing devices within environment 100) may perform issuer, personalization, delivery, or decommissioning operations that, collectively or individually, establish and manage occurrences of discrete events within the issuance and operational lifecycle of an EMV-compatible payment card, and generate corresponding portions of event data that characterize each occurrence of the discrete events.

Participating systems 152 and 172, and other network-connected systems that participate in the lifecycle of the EMV-compatible payment card, may perform additional operations that generate a cryptographically secure representation of each of the corresponding portions of the event data. For example, and in conjunction with one or more node systems operating within environment 100 (e.g., node system 132), participating systems 152 and 172 may perform operations that incorporate the cryptographically secure representations into one or more ledger blocks of a cryptographically secure, distributed-ledger data structure, such as the permissioned block-chain ledger described above, which maintains an immutable record of the event data characterizing the occurrences of each of the discrete events within the issuance and operational lifecycle of an EMV-compatible payment card.

Further, each element of the event data maintained within the ledger blocks of the permissioned block-chain ledger may characterize a corresponding event within the issuance or operational lifecycle of the EMV-compatible payment card, which may be established or managed by one or more of the network-connected systems that operate within environment 100 and participate in the issuance or operational lifecycle, e.g., participant systems 152 or 172. In certain aspects, each event-data element may also include data that uniquely identifies the EMV-compatible payment card and additionally or alternatively, the one or more network-connected systems that established or managed to corresponding event. Examples of the identification data may include, but are not limited to, a card-specific public cryptographic key generated on behalf of the EMV-compatible payment card (e.g., during any of the personalization processes described above) and an IP address or MAC address of the one or more network-connected systems.

As described in greater detail below, by associating each of the maintained event-data elements with a unique identifier of the corresponding EMV-compatible payment card, the permissioned block-chain ledger may establish an immutable and cryptographically secure record of a time evolution of a status of the EMV-compatible payment card throughout its issuance or operational lifecycle. In certain aspects, a network-connected system that participates in the lifecycle of the EMV-compatible payment card may, in conjunction with the one or more node systems operating within environment 100, perform operations that track and identify a current status of the EMV-compatible payment card based on a single, secure interaction within a distributed smart contract established and maintained within the permissioned block-chain ledger, as described below in reference to FIGS. 7A and 7B.

Figure 7A:
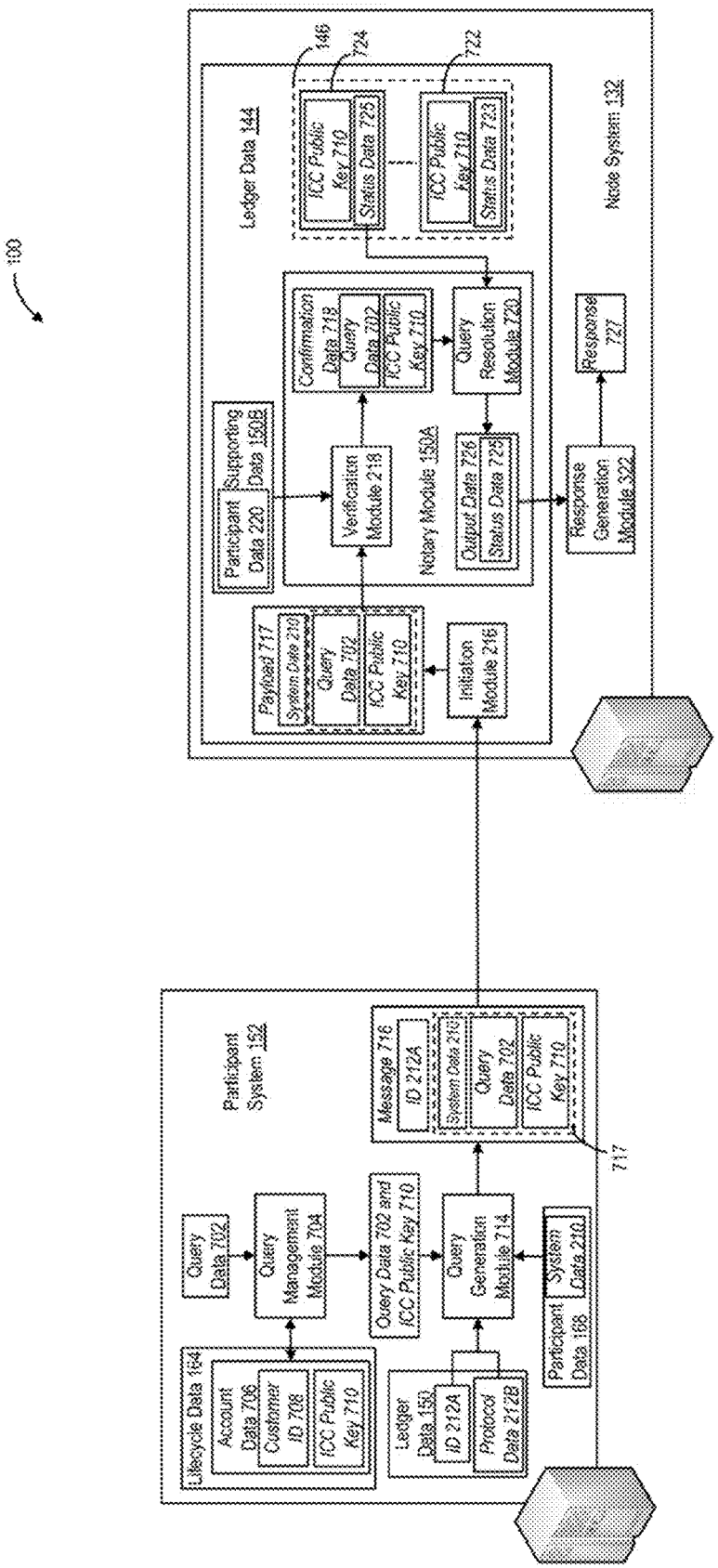
FIGS. 7A and 7B illustrate portions of an exemplary computing environment, in accordance with the disclosed embodiments.

Referring to FIG. 7A, a network-connected system, such as participant system 152, may participate in the issuance or operational lifecycle of the EMV-compatible payment card. In some aspects, participant system 152 may be maintained by an issuer of the EMV-compatible payment card or an issuer of one or more EMV-compatible payment applications (e.g., which can be provisioned to the EMV-compatible payment card), and may perform any of the exemplary issuer operations described above to establish and manage occurrences of discrete events within the lifecycle of an EMV-compatible payment card.

Examples of these issuer operations may include, but are not limited to: processes that manage inquiries received from a holder of the EMV-compatible payment card (e.g., a request to obtain a new EMV-compatible payment card or to replace an existing EMV-compatible payment card); processes that generate and maintain account data associated with the EMV-compatible payment card (e.g., an account number, an expiration date, a CSC or CVV, and account holder data); and processes that generate and securely distribute issuer-specific cryptographic data to other network-connected systems participating in the lifecycle of the EMV-compatible payment card.

Further, although not depicted in FIG. 7A, participant system 152 may also be in communication with one or more devices or computing systems operated by the holder of the EMV-compatible payment card, such as client device 102 operated by user 101. By way of example, user 101 may access, via client device 102, a web page or other digital portal associated with participant system 152 (e.g., through an executed web browser or an executed mobile application provided by participant system 152), and may provide input to client device 102 (e.g., via input unit 108) that requests an update regarding a current status of the EMV-compatible payment card within its issuance or operational lifecycle.

For instance, user 101 may have previously requested a replacement EMV-compatible payment card, such as a Visa™ credit card, by providing corresponding input to client device 102, which may package the provided input into request data for transmission to participant system 152 across network 120, along with additional information that uniquely identifies user 101 to participant system 152, such as a login credential of user 101. Although not illustrated in FIG. 1, participant system 152 may receive the request data and verify an integrity of the request data and an identity of user 101. Participant system 152 may also perform any of the exemplary issuer operations described herein to modify portions of the maintained account data (e.g., within lifecycle data 164) and provide appropriate portions of the modified account data to initiate personalization and additional delivery operations by one or more additional network-connected systems within environment 100, such as, but not limited to, participant system 172.

Subsequent to the request for the replacement card, user 101 may provide, via input unit 108, the input to client device 102 that requests the update regarding the current status of the requested EMV-compatible payment card within its issuance or operational lifecycle. As described above, client device 102 may package portions of the provided input into status query data, along with a customer identifier that uniquely identifies user 101 or client device 102 to participant system 152. Client device 102 may transmit the generated status query data across network 120 to participant system 152 using any appropriate communications protocol.

In FIG. 7A, client device 102 may receive the status query data, e.g., query data 702, and a query management module 704 may perform operations that verify an identity of user 101 or client device 102. For example, query management module 704 may access account data maintained within the one or more tangible, non-transitory memories (e.g., account data 706 of lifecycle data 164) and access customer data 708 that maintains identifiers of one or more customers or account holders of the issuer of the EMV-compatible payment card. Query management module 704 may, in some instances, verify the identity of user 101 and the status of user 101 as a customer or account holder based on a comparison of the customer identifier within query data 702 (e.g., that uniquely identifies user 101) and portion of accessed customer data 708.

In some instances, if query management module 704 were to determine that accessed customer data 708 fails to include the received customer identifier, query management module 704 may decline to process the received query regarding the current status of the EMV-compatible payment card. In response to the determination, query management module 704 may generate an error signal, which may cause participant system 152 to generate and transmit an error message across network 120 to client device 102 in response to query data 702 (not illustrated in FIG. 7A).

In other instances, if query management module 704 were to identify the received customer identifier within accessed customer data 708, query management module 704 may verify an identity of user 101 and the status of user 101 as a customer or cardholder. In response the successful verification, query management module 704 may perform operations that obtain, from account data 706, data that specifies a public cryptographic key associated with and provisioned to the EMV-compatible payment card (e.g., ICC public key 710). As described above, ICC public key 710, and a corresponding private cryptographic key, may be generated using any of the exemplary personalization processes described above (e.g., RSA-based key generation protocols), and may be distributed among network-connected systems participating in the lifecycle of the EMV-compatible payment card using any of the cryptographically secure processes described above.

Query management module 704 may provide portions of query data 702 and obtained ICC public key 710 as an input to a query generation module 714. As described below, query generation module 714 may perform operations that package query data 702 and obtained ICC public key 710 into a query message for submission to the distributed smart contract, which when executed by the or more node systems, performs operations that obtain and return, from one or more ledger blocks of the permissioned block-chain ledger, data characterizing a current status of the requested EMV-compatible payment card within its issuance or operational lifecycle.

For example, when executed by participant system 152, query generation module 714, and may retrieve system data 210 that uniquely identifies participant system 152 within environment 100 from the one or more tangible non-transitory memories, e.g., from participant data 168 of data repository 162. As described above, system data 210 may include a unique system identifier of participant system 152, such as an IP address or a MAC address. Further, query generation module 714 may also retrieve a contract identifier 212A that uniquely identifies the distributed smart contract within the permissioned block-chain ledger and protocol data 212B associated with the distributed smart contract from the one or more tangible non-transitory memories, e.g., from ledger data 170 of data repository 162. In some instances, and as described herein, contract identifier 212A may include a public cryptographic key assigned to or generated by the distributed smart contract, and protocol data 212B may include data characterizing a format of a request that, when received and processed by the one or more node systems, causes these one or more node systems to invoke the distributed smart contract and execute the code elements that establish the distributed smart contract.

In some aspects, query generation module 714 may generate a query message 716, which may be formatted in accordance with retrieved protocol data 212B. For example, query message 716 may include contract identifier 212A, which uniquely identifies the distributed smart contract within the permissioned block-chain ledger, and a payload 717, which includes, but is not limited to, system data 210, query data 702, and ICC public key 710. The disclosed embodiments are not limited to submission requests that include these exemplary components or formatting schemes, and in other aspects, query message 716 may include any additional or alternate data, formatted in accordance with any additional or alternate formatting scheme, that could be appropriate to participant system 152, the one or more node systems, and to the distributed smart contract.

Participant system 152 may then broadcast query message 716 across network 120 to the one or more node systems using any appropriate communications protocol. Each of the one or more node systems may receive a broadcasted copy of query message 716, and may perform any of the processes described herein to verify that participant system 152 is a participant in the permissioned block-chain network, and in response to a successful verification, to perform operations that determine a current status of the requested EMV-compatible payment card based on ICC public key 710 and the event data immutably maintained within the one or more ledger blocks of the permissioned block-chain ledger.

By way of example, as illustrated in FIG. 7A, node system 132 may receive query message 716, and an initiation module 216 may process query message 716 to detect a presence of contract identifier 212A, which uniquely identifies the distributed smart contract within the permissioned block-chain ledger. In some aspects, and in response to the detection of contract identifier 212A, initiation module 216 may perform operations that invoke the distributed smart contract and execute the code elements that establish the distributed smart contract, e.g., as maintained in notary module 150A of smart contract ledger blocks 150. For example, one or more processors of node system 132 may access the permissioned block-chain ledger (e.g., as maintained within ledger data 144 of data repository 142) and execute the code elements maintained within notary module 150A. In other instances, and consistent with the disclosed embodiments, node system 132 may execute an instance of a distributed virtual machine, which accesses the permissioned block-chain ledger and executes the code elements maintained within notary module 150A (e.g., based on output data generated by initiation module 216).

Upon invocation of the distributed smart contract, initiation module 216 may extract payload 717 from query message 716, and provide payload 717 as an input to notary module 150A, which includes the executable code elements that establish the distributed smart contract. For example, and as described above, verification module 218 of notary module 150A may receive payload 717, and perform operations that verify participant system 152 is a participant in the permissioned block-chain network and possesses a requisite permission to access the distributed smart contract. For example, verification module 218 may access participant data 220 specifying the unique identifiers of the member systems of the permissioned block-chain network (e.g., as maintained within supporting data 150B of smart contract ledger blocks 150). Verification module 218 may also process payload 717 to extract system data 210, which uniquely identifies participant system 152, and compare system data 210 against participant data 220 to verify the membership of participant system 152 within the permissioned block-chain network.

In one aspect, if participant data 220 fails to include the system identifier of participant system 152, verification module 218 may determine that participant system 152 is not a participant in the permissioned block-chain network. In response to this determination, the distributed smart contract may be configured to decline to process the status query, and notary module 150A may output data indicative of the unsuccessful verification, which node system 132 may relay back to participant system 152 (not illustrated in FIG. 7A).

Alternatively, if participant data 220 were to include the system identifier of participant system 152, verification module 218 may verify that participant system 152 is a participant in the permissioned block-chain network, and may output confirmation data 718 indicative of the successful verification. In some instances, confirmation data 718 may also include query data 702 (e.g., which specifies the query for the current status of the EMV-compatible payment card within its issuance or operational lifecycle) and ICC public key 710 (e.g., which identifies event data associated with the EMV-compatible payment card within the ledger blocks of the permissioned block-chain ledger). Verification module 218 may provide confirmation data 718 as an input to a query resolution module 720, which may access portions of the permissioned block-chain ledger and identify current status of the EMV-compatible payment card associated with ICC public key 710.

For example, and as described above, the permissioned block-chain ledger may include one or more ledger blocks, e.g., event ledger blocks 146, that record elements of event data characterizing occurrences of discrete events within the issuance or operational lifecycle of the EMV-compatible payment card. In some instances, each element of the event data maintained within event ledger blocks 146, e.g., event data elements 722 and 724 of FIG. 7A, may characterize a discrete event, or alternatively, an intermediate step that facilitates the establishment or management of a discrete event, and may include a unique identifier of the EMV-compatible payment card, such as ICC public key 710. In other aspects (not illustrated in FIG. 7A), event ledger blocks 146 may include additional elements of event data characterizing discrete events within the lifecycles of other products, executable applications, or elements of digital content, including other EMV-compatible payment cards issued to user 101 and other customers, and each of the additional elements of event data may include a corresponding unique identifier of the other products, executable applications, or elements of digital content.

Referring back to FIG. 7A, query resolution module 720 may access the latest, longest version of the permissioned block-chain ledger, e.g., as maintained within ledger data 144 of data repository 142. Query resolution module 720 may further identify, within the accessed permissioned block-chain ledger, elements of event data within event ledger blocks 146 that incorporate ICC public key 710 and thus, characterize discrete events within the issuance or operational lifecycle of the EMV-compatible payment card, such as event-data elements 722 and 724. In certain aspects, query resolution module 720 may determine that a corresponding one of the identified event-data elements includes data, e.g., status data, indicative of a current status of the requested EMV-compatible payment card within its issuance or operational lifecycle, and may perform operations that extract the status data from the corresponding one of the identified event-data elements.

By way of example, and based on temporal data included within each of the identified event-data elements, query resolution module 720 may establish that event-data element 724 characterizes the occurrence of the most-recent event within the issuance or operational lifecycle of the EMV-compatible payment card. For instance, a time stamp included within event-data element 724 may establish that the discrete event characterized by event-data element 724 occurred at a time or date subsequent to the occurrences of the discrete events characterized by the other identified event-data elements, such as event-data element 724.

In some aspects, query resolution module 720 may perform operations that extract, from event-data element 724, status data 725 that characterizes the current status of the requested EMV-compatible payment card within its issuance or operational lifecycle, and generate output data 726 that includes extracted status data 725. Query resolution module 720 may provide output data 726 as an input to response generation module 322 of node system 132, which may package portions of output data 726, including status data 725, into a response 727 to received query message 716. Node system 132 may transmit response 727 across network 120 to participant system 152.

Figure 7B:
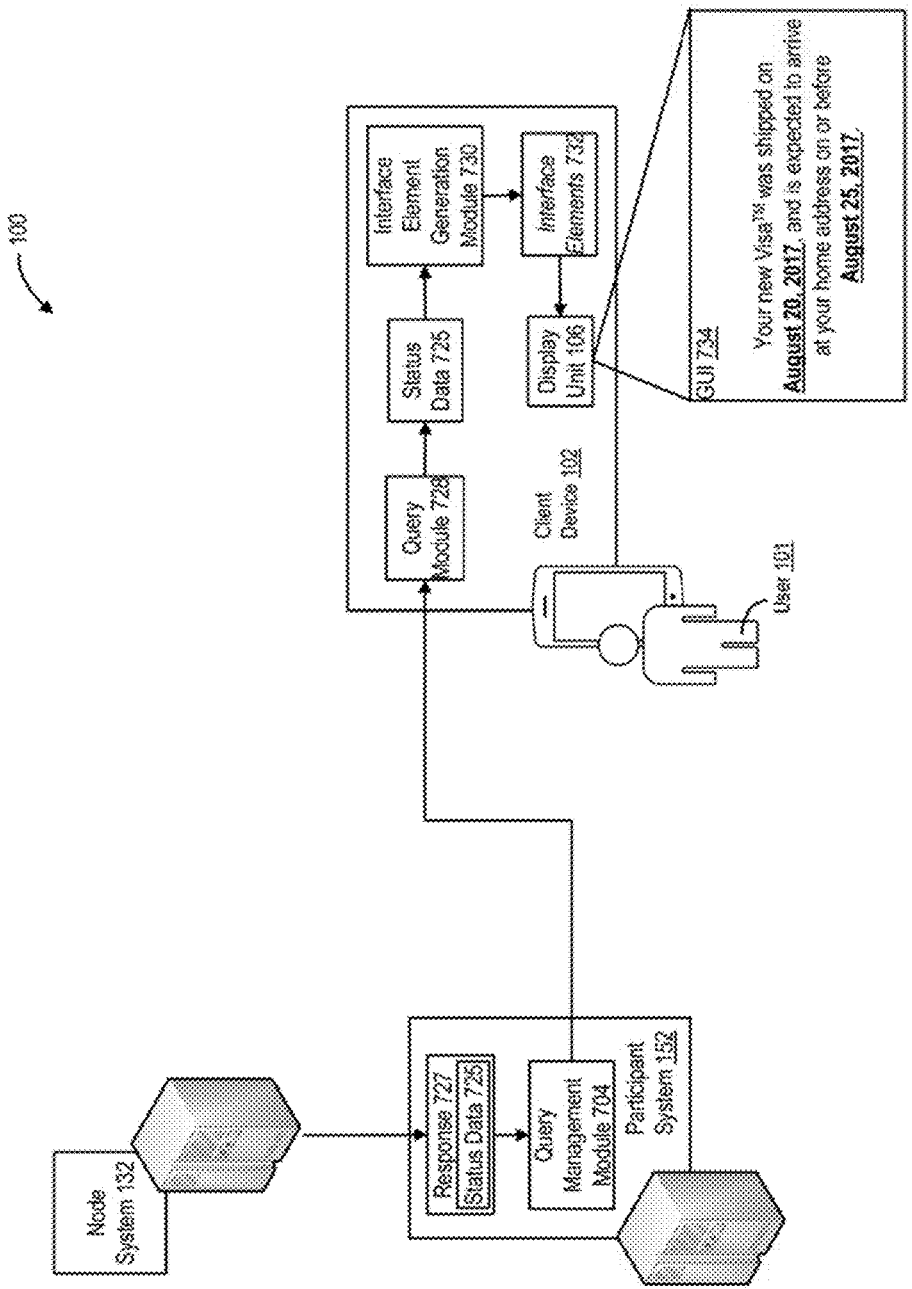

Referring to FIG. 7B, participant system 152 may receive response 727, which includes status data 725, and query management module 704 of participant system 152 may perform operations that relay received response 727 across network 120 to client device 102. In some aspects, a query module 728 of client device 102 may receive response 727, and perform operations that extract, from response 727, status data 725 indicative of the current status the requested EMV-compatible payment card within its operational lifecycle. For example, status data 725 may confirm a completion of operations that decommission an existing EMV-compatible payment card held by user 101 (e.g., which will be replaced by the requested EMV-compatible payment card), and a completion of issuance and personalization of the requested EMV-compatible payment card, e.g., by participant systems 152 and 172. Further, status data 725 may also indicate that the requested EMV-compatible payment card was shipped to an address specified by user 101 (e.g., e.g., a home address, etc.) on Aug. 20, 2017, and is expected to arrive at the specified address on Aug. 25, 2017.

In some aspects, query module 728 may provide portions of status data 725 as an input to an interface element generation module 730, which may perform operations to generate one or more interface elements, e.g., interface elements 732, representative of the provided portions of status data 725. Interface element generation module 730 may provide interface elements 732 to display unit 106 of client device 102, which may render interface elements 732 for presentation to user 101 within a corresponding graphical user interface (GUI) 734. For example, and without limitation, display unit 106 may present, within GUI 734, rendered interface elements that indicate the requested Visa™ payment card was shipped to a home address of user 101 on Aug. 20, 2017, and is expected to arrive at that home address on Aug. 25, 2017, III. Exemplary Hardware and Software Implementations Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including, but not limited to, notary module 150A, key generation module 202, key management module 206, key submission module 208, initiation module 216, verification module 218, public key submission module 222, block-chain generation module 226, distributed consensus module 230, key request module 302, public key retrieval module 312, response generation module 322, key verification module 326, symmetric key generation module 328, initiation module 404, hash generation module 408, symmetric encryption module 412, management module 416, cryptographic module 420, messaging module 426, management module 430, digital signature verification module, hash generation module 436, hash value verification module 440, symmetric decryption module 444, cryptographic module 452, block-chain generation module 458, block-chain generation module 512, query management module 704, query generation module 714, query resolution module 720, query module 728, and interface element generation module, can be implemented as one or more computer programs, i.e., one or more modules of computer program instructions encoded on a tangible non-transitory program carrier for execution by, or to control the operation of, a data processing apparatus (or a computer system). Additionally or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and/or "system" refer to data processing hardware and encompasses all kinds of apparatus, devices, and machines for processing data, including by way of example a programmable processor, a computer, or multiple processors or computers. The apparatus, device, and/or system can also be or further include special purpose logic circuitry, such as an FPGA (field programmable gate array) or an ASIC (application-specific integrated circuit). The apparatus, device, and/or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
   a communications module;
   a tangible, non-transitory memory storing instructions; and
   at least one hardware processor coupled to the communications module and the memory, the at least one hardware processor being configured to execute the instructions to:
   compute a first hash value based on event data characterizing an occurrence of one or more events within a lifecycle of a product;
   transmit a request to, and receive a response from, a first computing system across a communications network via the communications module, the request causing the first computing system to execute instructions included within distributed ledger data, and the response comprising a public cryptographic key of a second computing system;
   generate a symmetric encryption key based on the public cryptographic key of the second computing system;
   encrypt a first portion of the event data using the symmetric encryption key;
   compute a second hash value based on the encrypted first portion of the event data and an unencrypted second portion of the event data;
   generate message data that includes the encrypted and unencrypted portions of the event data and the computed first and second hash values;
   apply a first digital signature to the message data;
   transmit, via the communications module, the message data and the applied first digital signature to a second communications system via a secure communications channel, wherein the second computing system is configured to generate elements of the distributed ledger data that confirm a validity of the message data, the generated elements of the distributed ledger data comprising the encrypted first portion of the event data, the unencrypted second portion of the event data, the computed first and second hashes, the applied first digital signature, and a second digital signature applied to the message data by the second computing system, and the elements of the distributed ledger data tracking the occurrence of the one or more events within the lifecycle of the product;
   transmit, via the communications module, query data to the first computing system across the communications network, the query data comprising an identifier of the product and requesting a status of the product within the lifecycle, the query data causing the first computing system to execute the instructions included within the distributed ledger data and identify, within the elements of the distributed ledger data, status information associated with the product identifier; and
   receive, via the communications module, a response to the query data from the first computing system across the communications network, the response comprising the identified status information.

2. The apparatus of claim 1, wherein the at least one hardware processor is further configured to execute the instructions to generate or obtain at least a portion of the event data.

3. The apparatus of claim 1, wherein the at least one hardware processor is further configured to execute the instructions to:
   generate a public cryptographic key of the apparatus and a private cryptographic key of the apparatus; and
   perform operations that store the public and private cryptographic keys within a portion of the tangible, non-transitory memory.

4. The apparatus of claim 3, wherein:
the at least one hardware processor is further configured to execute the instructions to transmit, via the communications module, a message comprising the generated public cryptographic key to the first computing system across the communications network; and
the message causes the first computing system to execute the instructions included within the distributed ledger data to generate additional elements of the distributed ledger data that include the public cryptographic key of the apparatus.

5. The apparatus of claim 4, wherein:
the message further comprises data that identifies the apparatus; and
the message further causes the first computing system to execute the instructions included within the distributed ledger data to associate, within the additional elements of the distributed ledger data, the public cryptographic key of the apparatus and the data that identifies the apparatus.

6. The apparatus of claim 1, wherein the at least one hardware processor is further configured to execute the instructions to generate the symmetric encryption key based on an application of a symmetric key generation algorithm to the public cryptographic key of the second computing system.

7. The apparatus of claim 1, wherein:
the tangible, non-transitory memory stores a public cryptographic key associated with the instructions included within the distributed ledger data;
the response further comprises a third digital signature applied to the public cryptographic key of the second computing system; and
the at least one hardware processor is further configured to:
    perform operations that verify the third digital signature based on the public cryptographic key associated with the instructions included within the distributed ledger data; and
    generate the symmetric encryption key based on the public cryptographic key of the second computing system in response to the verification of the third digital signature.

8. The apparatus of claim 1, wherein:
the first portion of the event data comprises sensitive data, and the second portion of the event data comprises insensitive data; and
the at least one hardware processor is further configured to execute the instructions to process the event data to identify the first and second portions.

9. The apparatus of claim 1, wherein:
the product comprises an EMV-compatible payment card;
the events comprise an issuer event, a personalization event, a decommissioning event, or a delivery event;
the product identifier comprises a public cryptographic key associated with the EMV-compatible payment card; and
the instructions within the distributed ledger data establish a distributed smart contract.

10. An apparatus, comprising:
a communications module;
a storage unit storing instructions; and
at least one hardware processor coupled to the communications module and the storage unit, the at least one hardware processor being configured to execute the instructions to:
    transmit a request to, and receive a response from, a first computing system across a first communications network via the communications module, the request causing the first computing system to execute instructions included within distributed ledger data, and the response comprising a public cryptographic key of a second computing system;
    receive, via the communications module, message data from the second computing system across a second communications network, the message data comprising an encrypted first portion of event data, an unencrypted second portion of the event data, first and second hash values, and a first digital signature of the second computing system, the event data comprises information characterizing an occurrence of one or more events within a lifecycle of a product;
    generate a symmetric encryption key based on the public cryptographic key of the second computing system;
    compute a third hash value based on the encrypted first portion of event data and the unencrypted second portion of the event data;
    decrypt the encrypted first portion of the event data using the symmetric encryption key;
    compute a fourth hash value based on the decrypted first portion of the event data and the unencrypted second portion of the event data;
    perform operations that verify an integrity of the received message data based on (i) a comparison of the first and the third hash values and (ii) a comparison of the second and the fourth hash values;
    in response to the verified integrity, apply a second digital signature to the received message data;
    generate elements of the distributed ledger data that confirm the validated integrity of the received message data, the elements of the distributed ledger data comprising the encrypted first portion of the event data, the unencrypted second portion of the event data, the first and the second hash values, and the applied first and second digital signatures, and the elements of the distributed ledger data tracking the occurrence of the one or more events within the lifecycle of the product;
    transmit, via the communications module, query data to the first computing system across the communications network, the query data comprising an identifier of the product and requesting a status of the product within the lifecycle, the query data causing the first computing system to execute the instructions included within the distributed ledger data and identify, within the elements of the distributed ledger data, status information associated with the product identifier; and
    receive, via the communications module, a response to the query data from the first computing system across the communications network, the response comprising the identified status information.

11. The apparatus of claim 10, wherein the at least one hardware processor is further configured to:
perform operations that validate the first digital signature based on the public cryptographic key associated with the second computing system; and
verify the integrity of the received message data based on validation of the first digital signature.

12. The apparatus of claim 10, wherein the at least one hardware processor is further configured to execute the instructions to:

generate a public cryptographic key of the apparatus and a private cryptographic key of the apparatus; and perform operations that store the public and private cryptographic keys within a portion of the storage unit; and transmit, via the communications module, a message comprising the generated public cryptographic key to the first computing system across communications network, the transmitted message causing the first computing system to execute the instructions included within the distributed ledger data to generate additional elements of the distributed ledger data that include the public cryptographic key of the apparatus.

13. The apparatus of claim 12, wherein:

the message further comprises data that identifies the apparatus; and the message further causes the first computing system to execute the instructions included within the distributed ledger data to associate, within the additional elements of the distributed ledger data, the public cryptographic key of the apparatus and the data that identifies the apparatus.

14. The apparatus of claim 10, wherein the at least one hardware processor is further configured to execute the instructions to generate the symmetric encryption key based on an application of a symmetric key generation algorithm to the public cryptographic key of the second computing system.

15. The apparatus of claim 10, wherein:

the storage unit stores a public cryptographic key associated with the instructions included within the distributed ledger data;

the response further comprises a third digital signature applied to the public cryptographic key of the second computing system; and the at least one hardware processor is further configured to:

perform operations that verify the third digital signature based on the public cryptographic key associated with the instructions included within the distributed ledger data; and generate the symmetric encryption key based on the public cryptographic key of the second computing system in response to the verification of the third digital signature.

16. The apparatus of claim 10, wherein:

the product comprises an EMV-compatible payment card, the product being associated with a product identifier, the product identifier comprising a public cryptographic key associated with the EMV-compatible payment card;

the events comprise an issuer event, a personalization event, a decommissioning event, or a delivery event; and the instructions within the distributed ledger data establish a distributed smart contract.

17. An apparatus, comprising:

a communications module;

a storage unit storing instructions; and at least one hardware processor coupled to the communications module and the storage unit, the at least one hardware processor being configured to execute the instructions to:

generate event data that includes information characterizing an occurrence of one or more events within a lifecycle of a product;

compute a first hash value based on the event data;

encrypt a first portion of the event data using a symmetric encryption key;

compute a second hash value based on the encrypted first portion of the event data and an unencrypted second portion of the event data;

apply a digital signature to the encrypted first portion of the event data, the unencrypted second portion of the event data, and the computed first and second hash values;

generate elements of distributed ledger data that confirm the occurrence of the lifecycle event, the elements of the distributed ledger data comprising the encrypted first portion of the event data, the unencrypted second portion of the event data, the computed first and second hashes, and the applied digital signature, and the elements of the distributed ledger data track the occurrence of the one or more events within the lifecycle of the product;

receive, via the communications module, query data from a first computing system across the a network, the query data comprising an identifier of the product and requesting a status of the product within the lifecycle, the query data causing the at least one hardware processor to execute additional instructions included within the distributed ledger data and identify, within the elements of the distributed ledger data, status information associated with the product identifier; and transmit, via the communications module, a response to the query data to the first computing system across the communications network, the response comprising the identified status information.

* * * * *